United States Patent
Toshniwal et al.

(10) Patent No.: US 12,394,022 B2
(45) Date of Patent: *Aug. 19, 2025

(54) TECHNIQUES FOR PARALLEL CASCADE FILTERING IN POINT CLOUDS

(71) Applicant: AEVA, INC., Mountain View, CA (US)

(72) Inventors: Krishna Toshniwal, Mountain View, CA (US); Bruno Hexsel, Mountain View, CA (US); Kumar Bhargav Viswanatha, Santa Clara, CA (US); Jose Krause Perin, Mountain View, CA (US)

(73) Assignee: Aeva, Inc., Mountain View, CA (US)

( * ) Notice: Subject to any disclaimer, the term of this patent is extended or adjusted under 35 U.S.C. 154(b) by 601 days.

This patent is subject to a terminal disclaimer.

(21) Appl. No.: 17/719,112

(22) Filed: Apr. 12, 2022

(65) Prior Publication Data

US 2022/0236388 A1 Jul. 28, 2022

Related U.S. Application Data

(63) Continuation of application No. 17/398,440, filed on Aug. 10, 2021, now Pat. No. 11,307,295.

(Continued)

(51) Int. Cl.
*G01N 21/84* (2006.01)
*G01S 7/4912* (2020.01)
(Continued)

(52) U.S. Cl.
CPC .............. *G06T 5/70* (2024.01); *G01S 7/4912* (2013.01); *G01S 7/493* (2013.01); *G01S 17/32* (2013.01);
(Continued)

(58) Field of Classification Search
CPC ..... G06V 10/462; G01S 7/4912; G01S 7/493; G01S 17/32; G01S 17/58; G01S 17/89
See application file for complete search history.

(56) References Cited

U.S. PATENT DOCUMENTS 11,163,062 B1 * 11/2021 Viswanatha ............ G01S 17/36
11,307,295 B1 * 4/2022 Toshniwal ............ G01S 7/4808
(Continued)

FOREIGN PATENT DOCUMENTS

| CN | 113008296 A | 6/2021 |
| DE | 102019123483 A1 | 3/2021 |

(Continued)

OTHER PUBLICATIONS

Office Action of Application No. KR 10-2023-7015812 Dated Jun. 24, 2024, 7 pages.

(Continued)

*Primary Examiner* — Mark Hellner
(74) *Attorney, Agent, or Firm* — Womble Bond Dickinson (US) LLP

(57) ABSTRACT

A set of POIs of a point cloud are received at a first filter. Each POI of the set of POIs is filtered. At a second filter, based on a first metric, a first score of the POI is determined. At a third filter, based on a second metric, a second score of the POI is determined. At the first filter, based on the first score and the second score, whether to accept the POI, modify the POI, or reject the POI, is determined to extract range or velocity information.

21 Claims, 16 Drawing Sheets

Related U.S. Application Data

(60) Provisional application No. 63/092,228, filed on Oct. 15, 2020.

(51) Int. Cl.
*G01S 7/493* (2006.01)
*G01S 17/32* (2020.01)
*G01S 17/58* (2006.01)
*G01S 17/89* (2020.01)
*G06T 5/50* (2006.01)
*G06T 5/70* (2024.01)
*G06V 10/30* (2022.01)
*G06V 10/44* (2022.01)
*G06V 10/46* (2022.01)
*G06V 20/64* (2022.01)

(52) U.S. Cl.
CPC .............. *G01S 17/58* (2013.01); *G01S 17/89* (2013.01); *G06T 5/50* (2013.01); *G06V 10/30* (2022.01); *G06V 10/443* (2022.01); *G06V 10/462* (2022.01); *G06V 20/64* (2022.01)

(56) References Cited

U.S. PATENT DOCUMENTS

| | | |
|---|---|---|
| 2012/0294482 A1 | 11/2012 | Kasaoki |
| 2020/0256999 A1 | 8/2020 | Yellepeddi et al. |
| 2021/0103780 A1* | 4/2021 | Mammou ............... G06F 18/22 |
| 2021/0141092 A1 | 5/2021 | Chen et al. |
| 2021/0192841 A1 | 6/2021 | Hu et al. |
| 2021/0278523 A1 | 9/2021 | Urtasun et al. |
| 2021/0356599 A1* | 11/2021 | Liu .................... B60W 60/0011 |

FOREIGN PATENT DOCUMENTS

| | | | |
|---|---|---|---|
| EP | 3293700 A1 * | 3/2018 | ............ G06T 7/579 |
| EP | 3361278 A1 | 8/2018 | |
| JP | 2007-304069 A | 11/2007 | |
| JP | 2009-042177 A | 2/2009 | |
| JP | 2014-139536 A | 7/2014 | |
| JP | 2015-022541 A | 2/2015 | |
| JP | 2018-066679 A | 4/2018 | |
| JP | 2018-128456 A | 8/2018 | |
| KR | 102019009603 A | 8/2019 | |

OTHER PUBLICATIONS

First Office Action from related Japanese Patent Application No. 2023-523136 mailed Jul. 30, 2024 (2 pages).

* cited by examiner

TECHNIQUES FOR PARALLEL CASCADE FILTERING IN POINT CLOUDS

RELATED APPLICATIONS

This application is a continuation of U.S. patent application Ser. No. 17/398,440 filed on Aug. 10, 2021, which claims priority from and the benefit of U.S. Provisional Patent Application No. 63/092,228 filed on Oct. 15, 2020, the entire contents of which are incorporated herein by reference in their entirety.

TECHNICAL FIELD

The present disclosure relates generally to point set or point cloud filtering techniques and, more particularly, point set or point cloud filtering techniques for use in a light detection and ranging (LiDAR) system.

BACKGROUND

Frequency-Modulated Continuous-Wave (FMCW) LiDAR systems include several possible phase impairments such as laser phase noise, circuitry phase noise, flicker noise that the driving electronics inject on a laser, drift over temperature/weather, and chirp rate offsets. FMCW LiDAR point clouds may exhibit distinct noise patterns, which may arise from incorrect peak matching leading to falsely detected points that appear in the scene even when nothing is present. For example, when an FMCW LiDAR points to a fence or a bush, a number of ghost points may appear in the scene between the LiDAR and the fence. These ghost points or noisy points, which are also classified as False Alarm (FA) points, if left unfiltered, may introduce ghost objects and cause errors in the estimated target range/velocity.

SUMMARY

The present disclosure describes various examples of point cloud filters in LiDAR systems, e.g., parallel cascaded filters in LiDAR systems.

In some examples, disclosed herein is a method of filtering a point cloud. The characteristic features of FA points, which distinguish the FA points from true detections, may be exploited to identify the FA points and regions. When a point cloud is passed to a filtering algorithm, referred to herein as a filter, the filter works on either a single point or multiple points, referred to as points of interest (POI), at a given time. Some points and statistics from the neighborhood of the POI may be provided to the filter to provide a context. The context may be used to make a decision on the POI to check if the characteristics of the POI are consistent with the neighborhood points. The context may include contextual data around the POI to aid the filter to make a decision on the POI, by checking POI's consistency with the neighborhood points. Different metrics may be formulated to quantify these statistics/characteristics. Multiple filters may be designed to identify FA points with characteristics that are different from the point cloud. The identified FA points are then subsequently modified or removed from the point cloud. The resulting point cloud is a filtered out version of the original point cloud without the FA points. For example, the filter may iteratively get a POI from the point cloud, select points in the neighborhood of the POI to provide a context to the filter, and calculate a metric over the POI and its neighbors and then make a decision to keep, remove, or modify the POI (e.g., based on the calculated metric).

Embodiments of the present disclosure can include filters that incorporate the functionality of one or more filters. For example, a parallel cascaded filter may include multiple filters. The multiple filters may be used in parallel to score a POI. The multiple filters may be used on critical regions of the point cloud as the filters work independently to increase the confidence of the filter decision. Each of the multiple filters may determine a respective score of the POI. Multiple scores output from the multiple filters may be merged. The POI may be accepted, modified, or rejected on the basis of a set threshold in view of the multiple scores.

In some examples, a method of filtering points in a LiDAR system is disclosed herein. A set of POIs of a point cloud are received at a first filter, where each POI of the set of POIs comprises one or more points. Each POI of the set of POIs is filtered. At a second filter, a first set of neighborhood points of a POI is selected. A first metric for the first set of neighborhood points is computed. Based on the first metric, a first score of the POI is determined. At a third filter, a second set of neighborhood points of a POI is selected. A second metric for the second set of neighborhood points is computed. Based on the second metric, a second score of the POI is determined. At the first filter, based on the first score and the second score, whether to accept the POI, modify the POI, or reject the POI, is determined to extract at least one of range or velocity information related to a target. Provided the POI is accepted or modified, the POI is transmitted to a filtered point cloud to extract at least one of range or velocity information related to the target; provided the POI is rejected, the POI is prevented from reaching the filtered point cloud.

In some examples, a LiDAR system is disclosed herein. The LiDAR system comprises a processor and a memory to store instructions that, when executed by the processor, cause the system to receive, at a first filter, a set of POIs of a point cloud, where each POI of the set of POIs comprises one or more points. The system is further to filter each POI of the set of POIs. The system is to, at a second filter, select a first set of neighborhood points of a POI; compute a first metric for the first set of neighborhood points; and determine, based on the first metric, a first score of the POI. The system is to, at a third filter, select a second set of neighborhood points of a POI; compute a second metric for the second set of neighborhood points; and determine, based on the second metric, a second score of the POI. The system is to, at the first filter, based on the first score and the second score, determine whether to accept the POI, modify the POI, or reject the POI to extract at least one of range or velocity information related to the target. Provided the POI is accepted or modified, the system is to transmit the POI to a filtered point cloud to extract at least one of range or velocity information related to the target; provided the POI is rejected, the system is to prevent the POI from reaching the filtered point cloud.

In some examples, a LiDAR system is disclosed herein. The LiDAR system comprises an optical source to transmit a portion of a light signal towards a target, an optical receiver to receive a return beam from the target based on the light signal, a circuitry, and a memory to store instructions that, when executed by the processor, cause the system to receive, at a first filter, a set of POIs of a point cloud, where each POI of the set of POIs comprises one or more points. The system is further to filter each POI of the set of POIs. The system is to, at a second filter, select a first set of neighborhood points of a POI; compute a first metric for the first set of neighborhood points; and determine, based on the first metric, a first score of the POI. The system is to, at a third filter, select a second set of neighborhood points of a POI; compute a second metric for the second set of neighborhood points; and determine, based on the second metric, a second score of the POI. The system is to, at the first filter, based on the first score and the second score, determine whether to accept the POI, modify the POI, or reject the POI to extract at least one of range or velocity information related to the target. Provided the POI is accepted or modified, the system is to transmit the POI to a filtered point cloud; provided the POI is rejected, the system is to prevent the POI from reaching the filtered point cloud.

It should be appreciated that, although one or more embodiments in the present disclosure depict the use of point clouds, embodiments of the present invention are not limited as such and may include, but are not limited to, the use of point sets and the like.

These and other aspects of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and examples, should be viewed as combinable unless the context of the disclosure clearly dictates otherwise.

It will therefore be appreciated that this Summary is provided merely for purposes of summarizing some examples so as to provide a basic understanding of some aspects of the disclosure without limiting or narrowing the scope or spirit of the disclosure in any way. Other examples, aspects, and advantages will become apparent from the following detailed description taken in conjunction with the accompanying figures which illustrate the principles of the described examples.

BRIEF DESCRIPTION OF THE DRAWINGS

For a more complete understanding of various examples, reference is now made to the following detailed description taken in connection with the accompanying drawings in which like identifiers correspond to like elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

The described LiDAR systems herein may be implemented in any sensing market, such as, but not limited to, transportation, manufacturing, metrology, medical, virtual reality, augmented reality, and security systems. According to some embodiments, the described LiDAR system may be implemented as part of a front-end of frequency modulated continuous-wave (FMCW) device that assists with spatial awareness for automated driver assist systems, or self-driving vehicles.

Figure 1A:
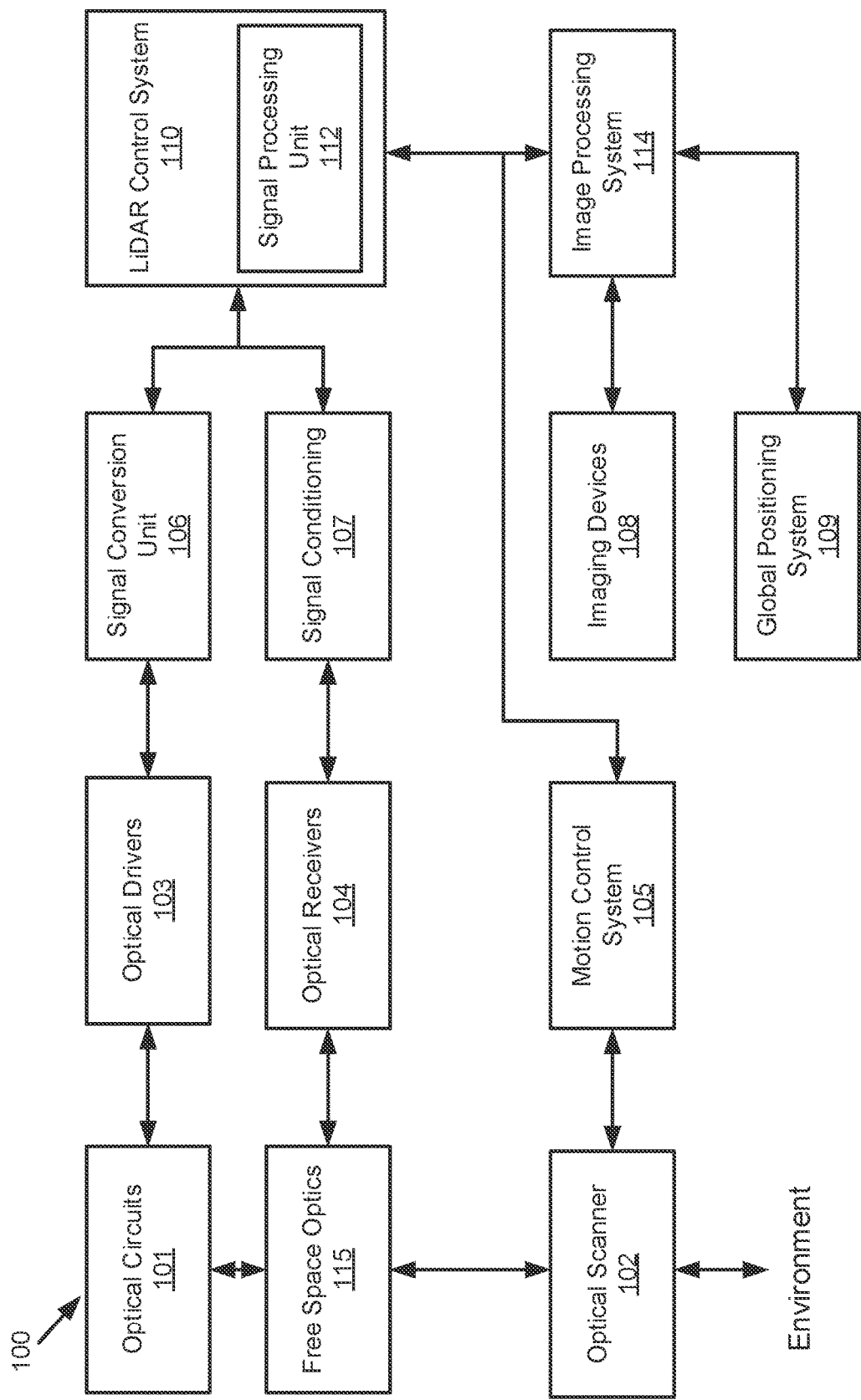
FIG. 1A is a block diagram illustrating an example LiDAR system according to embodiments of the present disclosure.

FIG. 1A illustrates a LiDAR system 100 according to example implementations of the present disclosure. The LiDAR system 100 includes one or more of each of a number of components, but may include fewer or additional components than shown in FIG. 1. According to some embodiments, one or more of the components described herein with respect to LiDAR system 100 can be implemented on a photonics chip. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles.

In some examples, the LiDAR system 100 includes an optical scanner 102 that includes one or more scanning mirrors that are rotatable along an axis (e.g., a slow-moving-axis) that is orthogonal or substantially orthogonal to the fast-moving-axis of the diffractive element to steer optical signals to scan a target environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coating window or the like.

To control and support the optical circuits 101 and optical scanner 102, the LiDAR system 100 includes LiDAR control systems 110. The LiDAR control systems 110 may include a processing device for the LiDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LiDAR control systems 110 may include a signal processing unit 112 such as a digital signal processor (DSP). The LiDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LiDAR control systems 110 are also configured to output digital control signals for the optical scanner 102. A motion control system 105 may control the galvanometers of the optical scanner 102 based on control signals received from the LiDAR control systems 110. For example, a digital-to-analog converter may convert coordinate routing information from the LiDAR control systems 110 to signals interpretable by the galvanometers in the optical scanner 102. In some examples, a motion control system 105 may also return information to the LiDAR control systems 110 about the position or operation of components of the optical scanner 102. For example, an analog-to-digital converter may in turn convert information about the galvanometers' position to a signal interpretable by the LIDAR control systems 110.

The LiDAR control systems 110 are further configured to analyze incoming digital signals. In this regard, the LiDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LiDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LiDAR control systems 110. In some examples, the signals from the optical receivers 104 may be subject to signal conditioning by signal conditioning unit 107 prior to receipt by the LiDAR control systems 110. For example, the signals from the optical receivers 104 may be provided to an operational amplifier for amplification of the received signals and the amplified signals may be provided to the LIDAR control systems 110.

In some applications, the LiDAR system 100 may additionally include one or more imaging devices 108 configured to capture images of the environment, a global positioning system 109 configured to provide a geographic location of the system, or other sensor inputs. The LiDAR system 100 may also include an image processing system 114. The image processing system 114 can be configured to receive the images and geographic location, and send the images and location or information related thereto to the LiDAR control systems 110 or other systems connected to the LiDAR system 100.

In operation according to some examples, the LiDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LiDAR control systems 110. The LiDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LiDAR control systems 110. A signal processing unit 112 may then receive the digital signals and interpret them. In some embodiments, the signal processing unit 112 also receives position data from the motion control system 105 and galvanometers (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 1B:
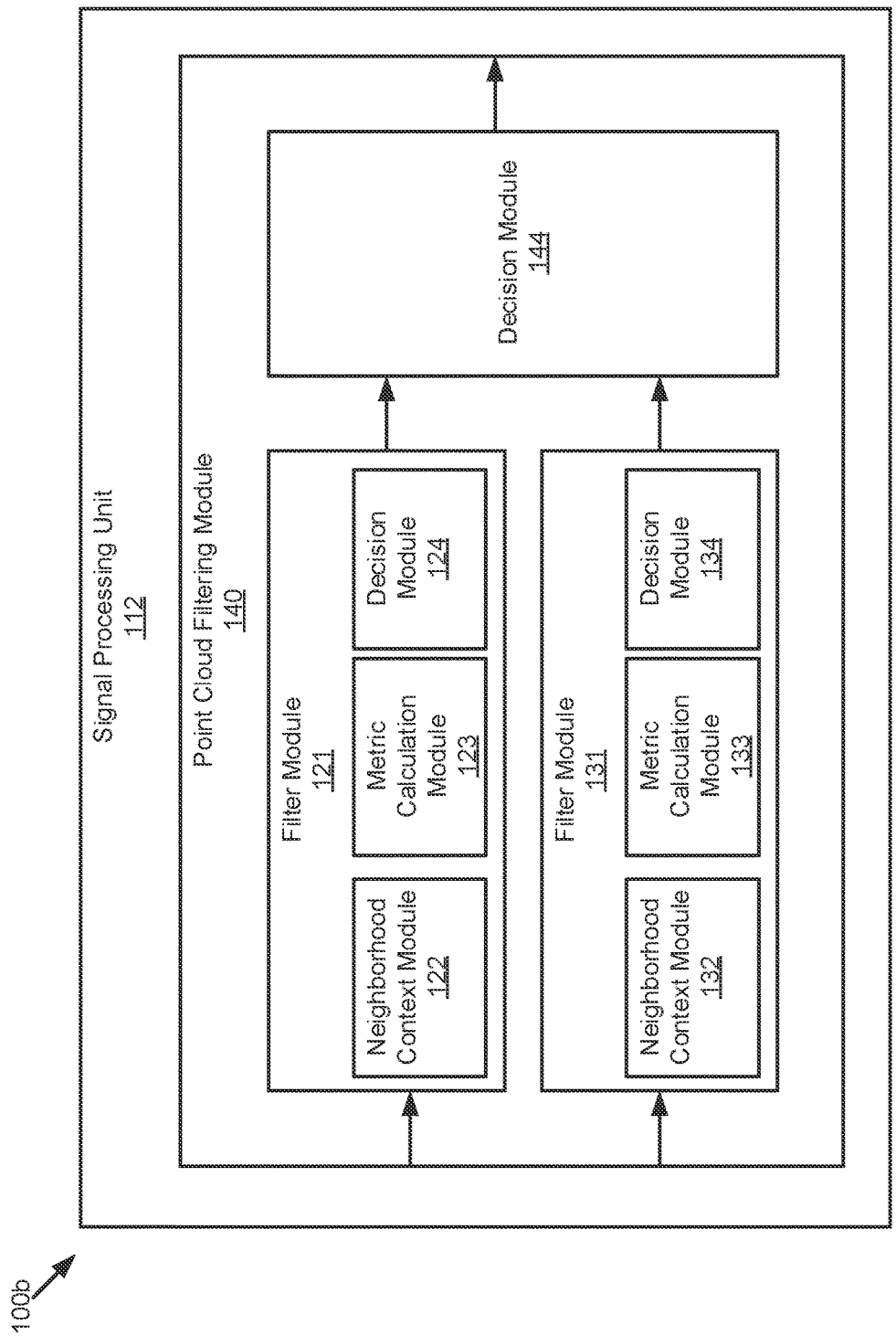
FIG. 1B is a block diagram illustrating an example of a point cloud filtering module of a LiDAR system according to embodiments of the present disclosure.

FIG. 1B is a block diagram 100b illustrating an example of a point cloud filtering module 140 in a LiDAR system according to embodiments of the present disclosure. The signal processing unit 112 may include the point cloud filtering module 140. It should be noted that, although the point cloud filtering module is depicted as residing within the signal processing unit 112, embodiments of the present disclosure are not limited as such. For instance, in one embodiment, the point cloud filtering module 140 can reside in computer memory (e.g., RAM, ROM, flash memory, and the like) within system 100 (e.g., LiDAR control system 110). According to some embodiments, point cloud filtering module 140 can be a filter that includes one or more filters.

With reference to FIG. 1B, the point cloud filtering module 140 includes the functionality to select neighborhood data points from a set of points, compute metrics, and make determinations concerning the acceptance, modification, removal and/or transmission of points to a point set or point cloud using one or more filters.

For instance, the point cloud filtering module 140 can include a filter module 121, a filter module 131 and a decision module 144. In some scenarios, the point cloud filtering module 140 may receive (e.g., acquire, obtain, generate or the like) a set of POIs from a point cloud, where each POI of the set of POIs includes one or more points. The filter module 140 includes the functionality to filter a POI of a given set of POIs provided by a particular point cloud.

As depicted in FIG. 1B, the filter module 121 may include a neighborhood context module 122, a metric calculation module 123 and a decision module 124. The neighborhood context module 122 includes the functionality to select a set of neighborhood points of a POI. The metric calculation module 123 includes the functionality to compute one or more metrics for a given set of neighborhood points. The decision module 124 includes the functionality to determine, based on a particular metric, a score of the POI.

According to some embodiments, the filter module 131 includes a neighborhood context module 132, a metric unit 133 and a determination unit 134 that are separate from the modules depicted in filter module 121. For instance, the neighborhood context module 132 includes the functionality to select a different set of neighborhood points for a particular POI. The metric calculation module 133 includes the functionality to compute a different metric for the different set of neighborhood points. The decision module 134 includes the functionality to determine, based on the different metric, a score of the POI.

The decision module 144 may receive both scores from the decision module 124 and the decision module 134. The decision module 144 includes the functionality to determine, based on the score from the decision module 124 and the score from the decision module 134, whether to accept the POI, modify the POI, or reject the POI, to extract at least one of range or velocity information related to a target. As will be described in greater detail, filter modules 121, 131 and decision module 144 can be included in a parallel cascaded filter. In some scenarios, the point cloud filtering module 140 may include one or more parallel cascaded filters.

Figure 2:
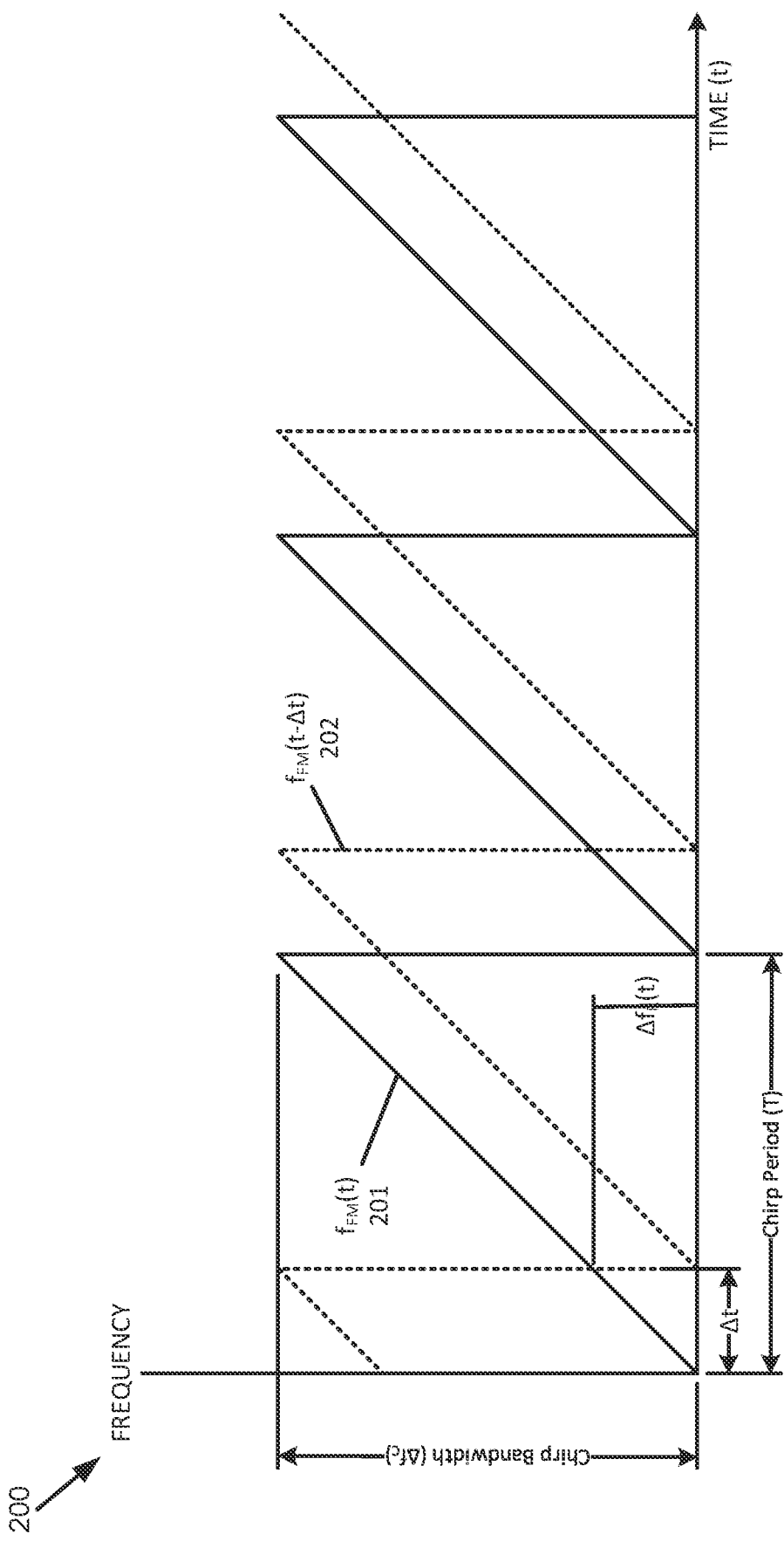
FIG. 2 is a time-frequency diagram illustrating an example of FMCW LIDAR waveforms according to embodiments of the present disclosure.

FIG. 2 is a time-frequency diagram 200 of an FMCW scanning signal 101b that can be used by a LiDAR system, such as system 100, to scan a target environment according to some embodiments. In one example, the scanning waveform 201, labeled as $f_{FM}(t)$, is a sawtooth waveform (sawtooth "chirp") with a chirp bandwidth $\Delta fc$ and a chirp period Tc. The slope of the sawtooth is given as k=($\Delta fc/Tc$). FIG. 2 also depicts target return signal 202 according to some embodiments. Target return signal 202, labeled as $f_{FM}(t-\Delta t)$, is a time-delayed version of the scanning signal 201, where $\Delta t$ is the round trip time to and from a target illuminated by scanning signal 201. The round trip time is given as $\Delta t=2R/v$, where R is the target range and v is the velocity of the optical beam, which is the speed of light c. The target range, R, can therefore be calculated as R=c($\Delta t/2$). When the return signal 202 is optically mixed with the scanning signal, a range dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as R=(c/2)($\Delta f_R(t)/k$). That is, the range R is linearly related to the beat frequency $\Delta f_R(t)$. The beat frequency $\Delta f_R(t)$ can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 202 will, in general, also include a frequency offset (Doppler shift) if the target has a velocity relative to the LIDAR system 100. The Doppler shift can be determined separately, and used to correct the frequency of the return signal, so the Doppler shift is not shown in FIG. 2 for simplicity and ease of explanation. It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta f_{Rmax}$) is 500 megahertz. This limit in turn determines the maximum range of the system as $R_{max}=(c/2)(\Delta f_{Rmax}/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

Figure 3A:
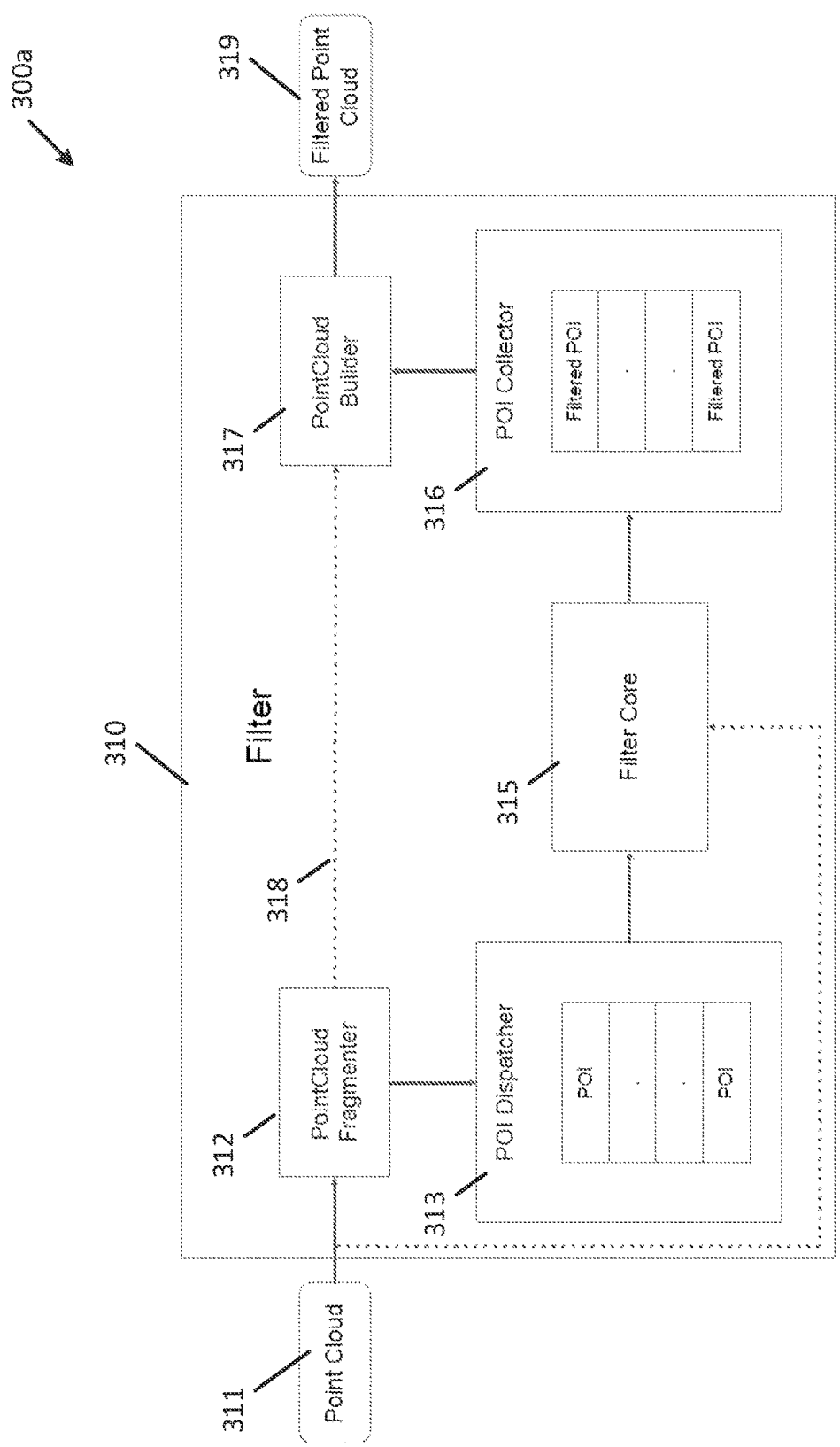
FIG. 3A is a block diagram illustrating an example of a point cloud filter according to embodiments of the present disclosure.

FIG. 3A is a block diagram that depicts system 300a which includes the use of a point cloud filter (e.g., point cloud filter 310) according to embodiments of the present disclosure. In some scenarios, a point cloud (e.g., 311) is a set of data points (or points) in the scene collected using one or more components of a light scanning system (e.g., LiDAR system 100). It should be noted that the terms "data point" and "point" are interchangeably used in the present disclosure.

Each point has a set of coordinates, e.g., (X, Y, Z) and/or (Range, Azimuth, Elevation), which can be used by LiDAR system 100 to determine a point's location in the scene relative to the position of one or more sensors used by LiDAR system 100. Additional attributes such as velocity, intensity, reflectivity, time recorded, metadata and the like may also be calculated for a particular point. True detection (TD) points are points in the scene that represent an object or segment of the scene such as ground, foliage, etc. False alarm (FA) points are untrue detection points, e.g., ghost points or noisy points, in the scene. FA points cannot be associated with any object or segment of the scene.

In some scenarios, point clouds (e.g., FMCW LiDAR point clouds) exhibit distinct noise patterns which primarily arise from incorrect peak matching leading to FA points that appear in the scene even when nothing is present. For example, when an FMCW LiDAR system scans points corresponding to a fence or a bush, a number of FA points, e.g., ghost points, may appear in the scene between the LiDAR system and the fence. The FA points have characteristic features which distinguish them from True Detection (TD) points. As described in greater detail herein, embodiments of the present disclosure can exploit these distinguishing features to identify these points and regions, and then subsequently modify or remove them from the point cloud while leaving the TD points untouched. The resulting point cloud (e.g., filtered point cloud 319) is a filtered out version of the original point cloud (e.g., point cloud 311) without the FA points.

As described herein, the point cloud filtering performed by the embodiments can remove points from a point cloud which do not satisfy a predetermined threshold for a metric. For example, a filter may refer to a filtering technique or algorithm which processes a point cloud and outputs a filtered point cloud. In some embodiments, a filter may include a process in which a point cloud is processed, e.g., points not satisfying a predetermined threshold for a metric are removed, and a filtered point cloud is outputted. The filtered point cloud produced by embodiments described herein may have some points modified and some points removed.

The filter processes, described herein according to embodiments, can process a predetermined number of points, e.g., a single point or multiple points, at a time. A predetermined number of points that the filter is configured to work on at a given time include POIs. Each POI may include one or more points. The POIs may be identified by embodiments based on a predetermined threshold, such as a velocity threshold or other types of trivial identifiers. The filters described herein can be configured to work on a POI at a time, where the POI may include a single point or multiple points.

As will be explained in greater detail, upon receipt of one or more points from a point cloud, the filters described herein can work on either a POI, a single point or multiple points, at a given time. These filters can be configured to use points and statistics from the neighborhood of the POI may be provided to the filter to provide a context. The filters can be configured to use contextual information to make decisions made for a POI and to check if the characteristics of the POI are consistent with the neighborhood points. The contextual information may include contextual data around the POI to aid the filter to make a decision on the POI, by checking POI's consistency with the neighborhood points. The embodiments described herein can be configured to use different metrics to quantify these statistics/characteristics. Multiple filters may be used to identify FA points with characteristics that are different from the point cloud. The identified FA points are then subsequently modified or removed by the described embodiments from the point cloud. The resulting point cloud is a filtered out version of the original point cloud without the FA points.

For instance, as depicted in the FIG. 3A embodiment, the point cloud 311 may be received, for example, by the filter 310. In one scenario, the filter 310 may include a point cloud fragmenter 312, a POI dispatcher 313, a filter core 315, a POI collector 316, and/or a point cloud builder 317. The point cloud 311 may be fed into the point cloud fragmenter 312, which identifies regions of the point cloud 311 that the filter 310 will be working on and creates one or more POIs that can be sent to the POI dispatcher 313. Portions of the point cloud 311 that the filter 310 does not work on are communicated or transmitted to the point cloud builder 317. The point cloud fragmenter 312 identifies the regions of the point cloud 311 that may have FA points, which in turn identifies a set of POIs for the filter to work on. The point cloud fragmenter 312 identifies the set of POIs in the regions that the filter 310 will be working on based on a predetermined threshold, for example, a velocity threshold. For example, if the filter 310 works on all points with a velocity >10 m/s, then the point cloud fragmenter 312 is configured to ignore any points with a velocity <10 m/s. The ignored points are then transmitted (e.g., communicated) to the point cloud builder 317 through the link 318 in between the point cloud fragmenter 312 and the point cloud builder 317. The points that the filter 310 has not worked on may be considered as approved by the filter 310 and are therefore present in the output point cloud 319.

In one scenario, a size of the POI may be chosen, for example, a quantity of points in the POI. Then the regions of the point cloud 311 that the filter 310 would be working on may be identified. The size of the POI and the region information may help the point cloud fragmenter 312 to fragment the point cloud 311 into the set of POIs that the filter core 315 can work on.

The POI dispatcher 313 receives the POIs from the point cloud fragmenter 312 and sends the POIs to the filter core 315, one POI at a time, for processing. In some scenarios, this dispatch mechanism may be parallelized on multiple threads/graphics processing unit (GPU) cores or field-programmable gate array (FPGA) for faster processing. The dispatch strategy chosen by embodiments can depend on how the filter Core 315 operates on the POI. In scenarios, multiple filter cores may be initialized to process multiple threads or GPU cores. In these scenarios, the POI dispatcher 313 can be configured to handle this coordination.

The filter core 315 houses one or more modules of the filter 310 which can each be configured to process the POIs, which will be discussed below. The filter core 315 may be configured to select a combination of neighborhood context strategy, metric and decision that the filter will be making. The combination may depend on the noise pattern that the filter is configured to target.

In some embodiments, the filter 310 may be configured to make decisions on the POIs including approving, modifying, rejecting, delegating (transmitting to another filter), or scoring the POI. Once a POI is processed, the filter may determine a "filtered POI" which includes a decision made for the POI (e.g., including, but not limited to, approved, modified, rejected, delegated, or scored).

The POI collector 316 can be configured to collect the filtered POIs received from the filter core 315 and send the filtered POIs to the point cloud builder 317, for example, once all the POIs are processed.

The point cloud builder 317 can be configured to construct the point cloud 319 from all the approved points in the POIs and the bypassed POIs received from the point cloud fragmenter 312. The filtered point cloud 319 is output from the filter 310. In some scenarios, the filtered point cloud 319 may have less number of points than the input point cloud 311, as the points rejected by the filter 310 may be removed from the input point cloud 311. The point cloud builder 317 can be configured to operate in tandem with the point cloud fragmenter 312. The point cloud builder 317 is configured to receive information related to points which are not being processed by the filter core 315.

The filter 310 may also be configured to selectively operate on a smaller point group instead of waiting for the entire point cloud frame to be built to reduce overall system latency.

Figure 3B:
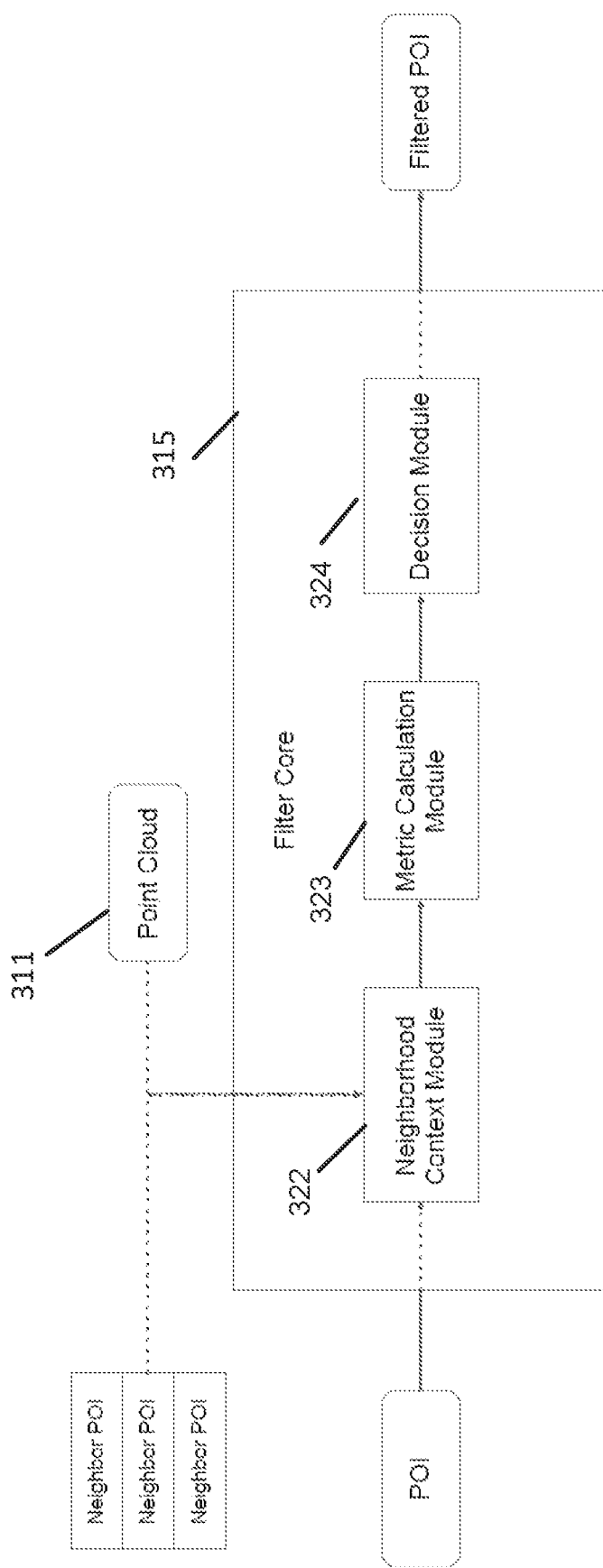
FIG. 3B is a block diagram illustrating an example of a filter core of a point cloud filter according to embodiments of the present disclosure.

FIG. 3B is a block diagram illustrating an example of the filter core 315 of the point cloud filter 310 according to embodiments of the present disclosure. A filter core may be configured to target noise with specific characteristics. Multiple filter cores may be designed to tackle different potential noise patterns in the scene. The function of the filter, as described herein, may be encompassed by the filter core. It should be appreciated that the terms "filter" and "filter core" may be used interchangeably herein. In some embodiments, the filter core 315 may include a neighborhood context module 322, a metric calculation module 323 and a decision module 324. The neighborhood context module 322 is configured to select a set of neighborhood points of a POI. The metric calculation module 323 is configured to compute a metric for the set of neighborhood points. The decision module 124 is configured to determine, based on the metric, whether to accept the POI, modify the POI, reject the POI, transmit the POI to another filter, or score the POI.

In some implementations, the filter core 315 may be configured to process only one POI at a time. The neighborhood context module 322 can also be configured to receive one or more neighbor POIs, statistics of the neighbor POIs, and/or the entire point cloud 311. This contextual information may be used to make a decision on the POI by checking if the characteristics are consistent with the neighborhood points. In some instances, a metric may be used by the embodiments described herein for the type of noise that the filter is processing. After processing the POI, the decision module 124 may be configured to perform one or more actions including, but not limited to, accepting, modifying, discarding, transmitting (delegating) the POI, or scoring the POI.

Figure 4A:
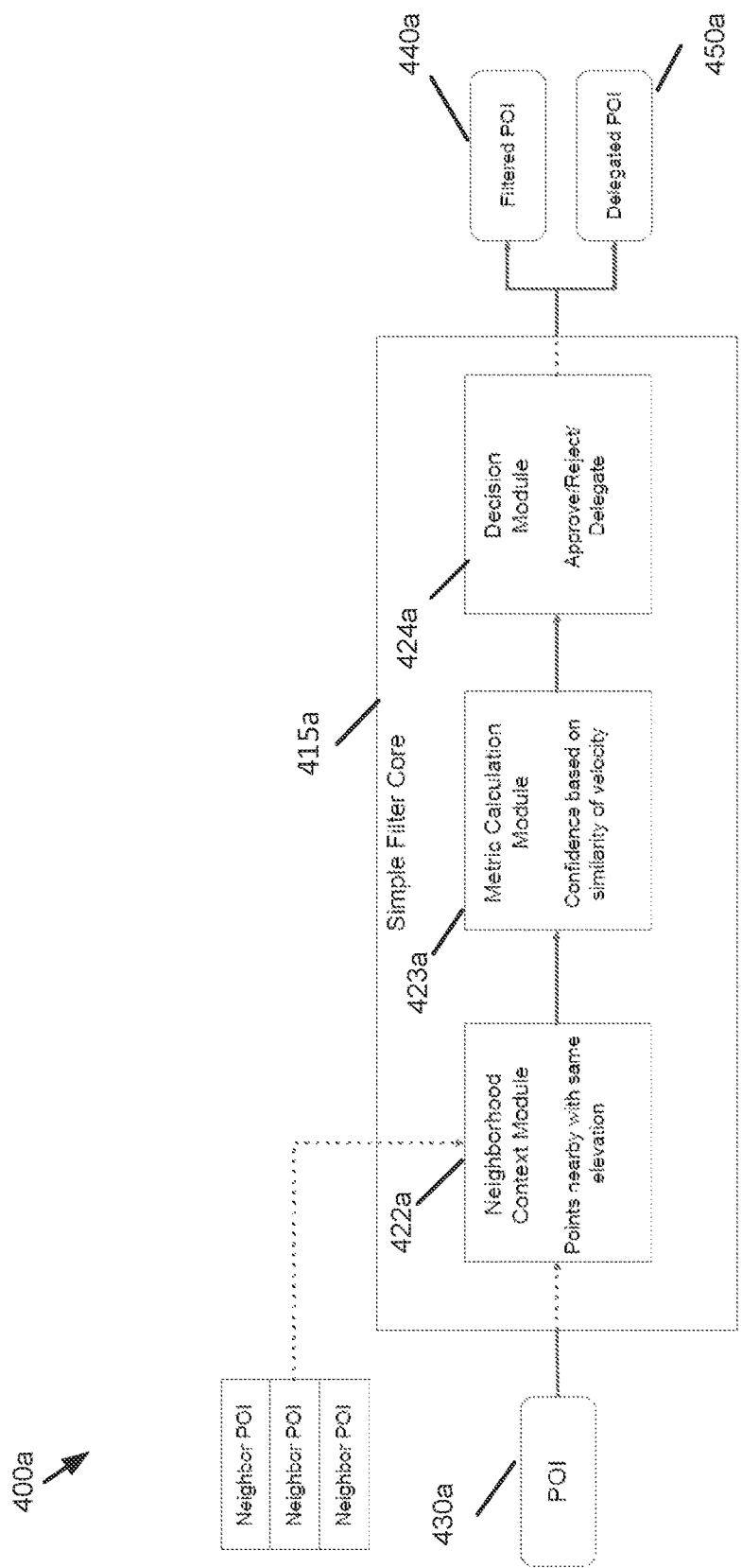
FIG. 4A is a block diagram illustrating an example of a filter core according to embodiments of the present disclosure.

FIG. 4A is a block diagram of a system 400a that includes a filter core as used in accordance with embodiments of the present disclosure. In one embodiment, the filter core includes a simple filter core 415a. It should be noted that the term "filter" and "filter core" may be used interchangeably in this disclosure. According to some embodiments, a filter can operate on a set of POIs in a point cloud that may be based on, for example, a combination of different selection of neighborhood data points, different metrics, and/or decisions. The filter may be a simple filter or a complex filter, as described herein. It should be appreciated that the examples described herein are only for illustration purposes. There may be many other embodiments of a simple filter core based on this disclosure.

Referring to FIG. 4A, in some scenarios, a simple filter core, e.g., the simple filter core 415a, includes fewer computational resources to perform the filtering operations described herein relative to a complex filter core, e.g., a complex filter core 515a (which will be described in FIG. 5A). For instance, the computational resources resident on the simpler filter core, e.g., the simpler filter core 415a, enable the simpler filter core to perform filtering operations that require shorter compute time, access fewer resources, and/or consume less power relative to the computational resources required by the complex filer core, e.g., the complex filer core 515a. For instance, predetermined thresholds can be used to determine the amount of processing to be performed at the simple filter or the simple filter core (e.g., including, but not limited to, compute time thresholds, power thresholds, and the like). Additional examples that demonstrate the hardware/software profile of simple filters are described herein.

As depicted in FIG. 4A, the simple filter core 415a may include a neighborhood context module 422a, a metric calculation module 423a, and a decision module 424a. The neighborhood context module 422a may be configured to select a window of points nearby for a POI 430a, for example, a window of data points around the POI having either the same azimuth/elevation.

The metric calculation module 423a may be configured to compute a confidence metric based on a similarity of point properties, e.g., velocity, across the POI and the selected neighborhood data points. The simple filter core 415a may be configured to check if the POI has properties that are not drastically different from the neighborhood points. For example, if the minimum, maximum, or range of velocity of the POI is within a respective predetermined threshold to the minimum, maximum, or range of the neighborhood points, then the confidence metric of the POI may be determined to be high.

The decision module 424a may be configured to determine, based on the confidence metric, whether to accept the POI, modify the POI, reject the POI, score the POI, or delegate/transmit the POI to the complex filter core, e.g., 515a. The POI may be approved if the confidence metric of the POI is determined to be high. For example, when the confidence metric is within a first predetermined threshold, the POI 430a is accepted and becomes a filtered POI 440a. When the confidence metric is within the first predetermined threshold, but there are detected inconsistencies with the neighborhood context within a particular predetermined threshold, modifications may be made to the POI. For example, point properties such as range and/or velocity may be modified. When the confidence metric of the POI is not consistent with the neighborhood points, e.g., not consistent with a second predetermined or specified threshold, the POI is classified as an FA. The POI is to be discarded or removed or filtered out.

When a decision cannot be made, but the POI was found suspicious, then the POI may be marked as a delegated POI 450a and transmitted (e.g., delegated) to a complex filter core, e.g., the complex filter core 515a. The POI may be passed to the complex filter core, e.g., the complex filter core 515a. The complex filter core, e.g., the complex filter core 515a may be configured to make a decision to accept, modify, or reject the POI. Delegating determinations in this manner can reduce the load on the subsequent complex filter core, e.g., the complex filter core 515a, as the subsequent complex filter core, e.g., the complex filter core 515a, does not operate on the entire point cloud but only on a subset of points (i.e., the undetermined or transmitted POIs).

With a probability that the POI is not an FA, the decision module 424a may score the POI. When the confidence metric is within a predetermined threshold, there is the probability that the POI is not an FA. Then, the POI may be assigned a score by the decision module 424a. A different filter or algorithm may be used to assign or determine a different score for the POI. Multiple filters or algorithms may be used to assign or determine multiple scores for the POI. An additional filter or an additional decision module may look at the multiple scores and remove the POI if the POI has at least one score of the multiple scores that is lower than the predetermined threshold.

Figure 4B:
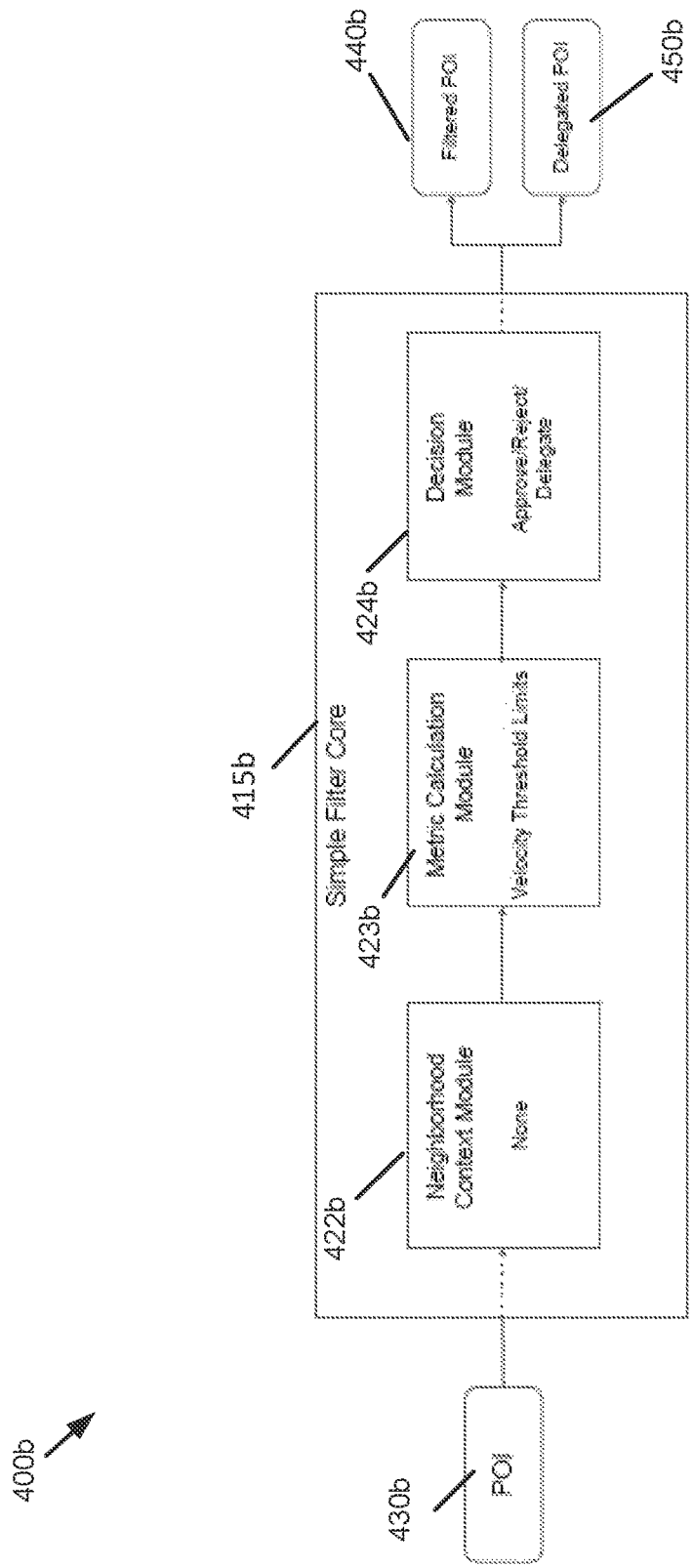
FIG. 4B is a block diagram illustrating another example of a filter core according to embodiments of the present disclosure.

FIG. 4B is a block diagram of a system 400b that includes a simple filter core 415b as used in accordance with embodiments of the present disclosure. FIG. 4B provides an additional example that demonstrates the types of functions the simple filter can perform based on its respective hardware/software profiles described herein. For instance, simple filter can be configured to perform the operations described herein constrained by compute time, power consumption, etc.

With reference to FIG. 4B, the simple filter core 415b may include a neighborhood context module 422b, a metric calculation module 423b, and a decision module 424b. The neighborhood context module 422b may be configured to bypass selecting a neighborhood for a POI 430b. The metric calculation module 423b may be configured to check if the POI has a very low velocity (lower than a first predetermined threshold, e.g., 1 m/s) or the POI points has a very high velocity (higher than a second predetermined threshold, e.g., 100 m/s). The decision module 424b may approve the POI if the POI has a very low velocity, the POI may become a filtered POI 440b. The decision module 424b may be configured to reject the POI if the POI points have a very high velocity. The decision module 424b may be configured to delegate (transmit) any POI, e.g., with a velocity in between the first predetermined threshold and the second predetermined threshold, then the POI may become a delegated POI 450b. Because most of the scene is usually static, any noisy dynamic points may be addressed by the complex filter core, e.g., 515b. With a probability that the POI is not an FA, the decision module 424b may score the POI. When the confidence metric is within a predetermined threshold, there is the probability that the POI is not an FA. Then, the POI may be assigned a score by the decision module 424b.

Figure 5A:
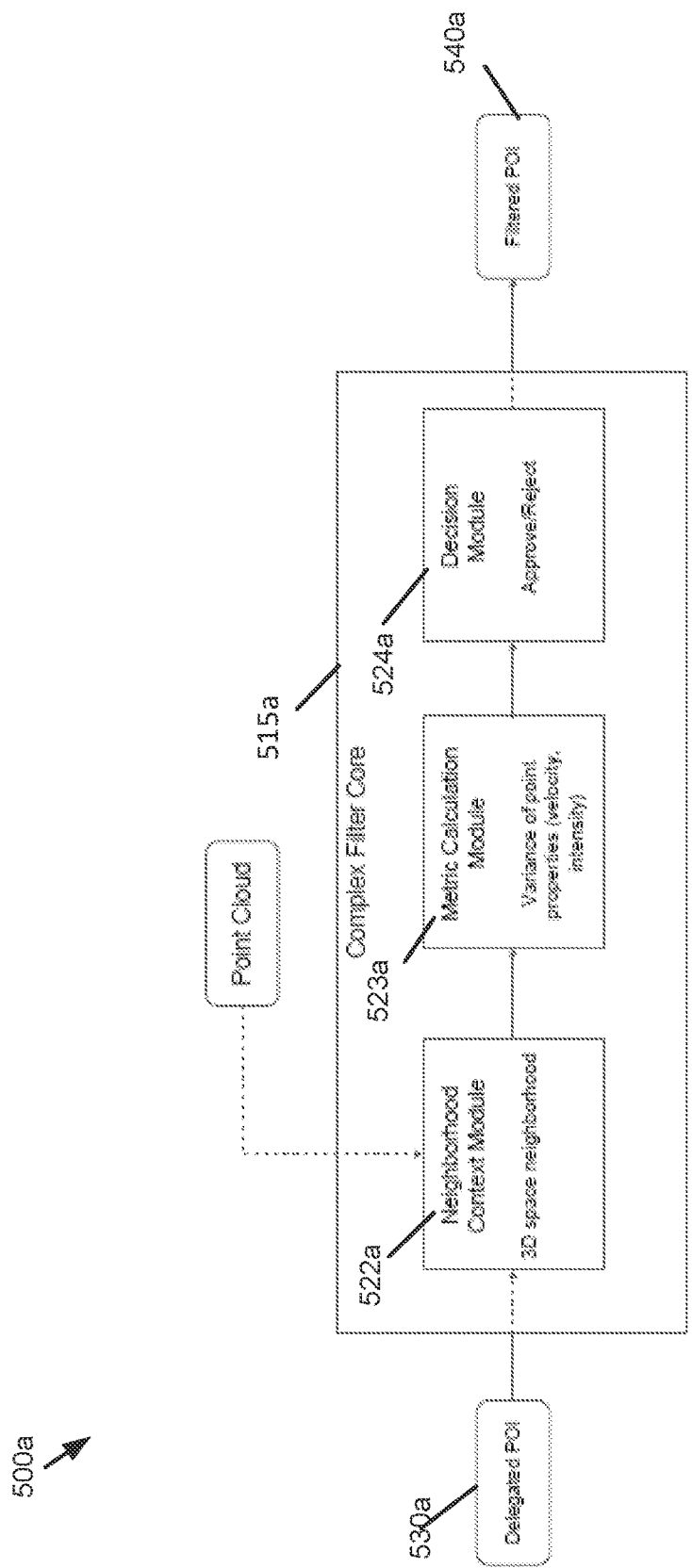
FIG. 5A is a block diagram illustrating yet another example of a filter core, according to embodiments of the present disclosure.

FIG. 5A is a block diagram of a system 500a that includes a complex filter core 515a as used in accordance with embodiments of the present disclosure. In some scenarios, the complex filter core 515a includes more computational resources to perform complex filtering operations described herein. The complex filter core 515a can be configured to perform one or more complex operations in a manner that requires access to more computational resources, more compute time, and/or more power relative to a simple filter described herein. For instance, predetermined thresholds can be used to determine the amount of processing to be performed at the complex filter, e.g., the complex filter core 515a, (e.g., including, but not limited to, compute time thresholds, power thresholds, and the like). In some scenarios, certain FA data points or POI points may require a broader neighborhood context and/or greater computational resources for detection by the complex filter. Additional examples that demonstrate the hardware/software profile of complex filters are described herein.

For instance, with reference now to FIG. 5A, in one embodiment, the complex filter core 515a may include a neighborhood context module 522a, a metric calculation module 523a, and a decision module 524a. The neighborhood context module 522a may be configured to select a 3D space neighborhood for a delegated POI 530a (e.g., 450a). To get the neighborhood data points in the neighborhood, a search tree (KD Tree, OctTree, or variants) may be constructed on all the POIs.

The metric calculation module 523a may be configured to compute a variance of point properties including velocity, intensity, or range, etc. A variance of the POI properties may be computed or calculated over the 3-D space neighborhood. The POI properties may include the velocity, intensity, range, or even higher order moments such as skewness and kurtosis, etc., of the data point/POI. The variance of the POI properties (e.g., the velocity or intensity) may be calculated over the neighborhood (e.g., neighborhood data points).

The decision module 524a may be configured to determine, based on the confidence metric, whether to accept the POI, modify the POI, reject the POI, or delegate/transmit the POI to another filter core. The variance of the data point/POI properties (e.g., the velocity or intensity) may be compared against a predetermined threshold. When the POI properties (e.g., the velocity or intensity) are lower than the predetermined threshold, the data point/POI may be accepted or approved to become a filtered POI 540a. The filtered POI 540a may be added to a filtered output point cloud. When the POI properties (e.g., the velocity or intensity) are not lower than the predetermined threshold, the data point/POI may be rejected. When a decision cannot be made, then the POI may be transmitted to the subsequent filter core. With a probability that the POI is not an FA, the decision module 524a may score the POI. When the confidence metric is within a predetermined threshold, there is the probability that the POI is not an FA. Then, the POI may be assigned a score by the decision module 524a.

Figure 5B:
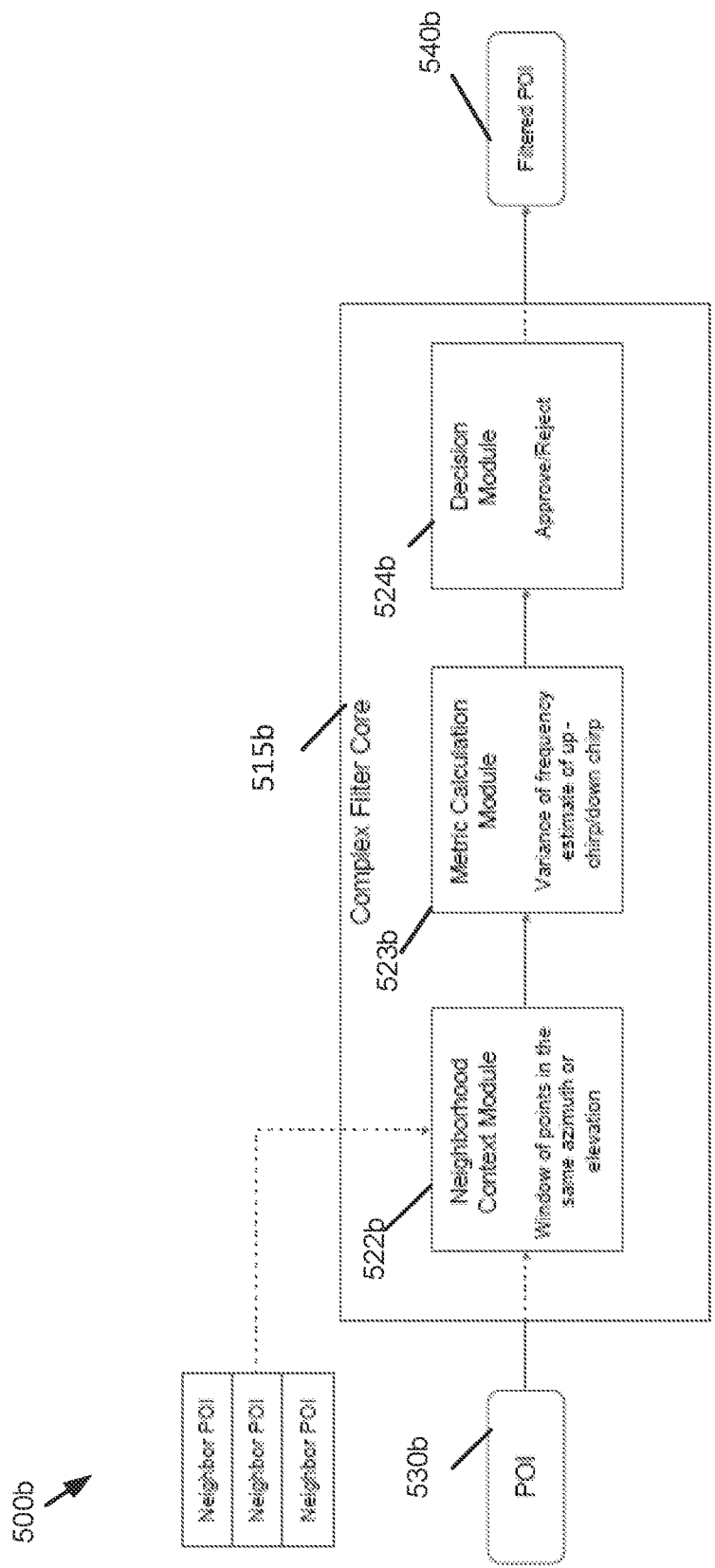
FIG. 5B is a block diagram illustrating still another example of a filter core, according to embodiments of the present disclosure.

Referring to FIG. 5B, the complex filter core 515b may include a neighborhood context module 522b, a metric calculation module 523b, and a decision module 524b. The neighborhood context module 522b may select a window of data points in the same azimuth or elevation around a POI 530b. The neighborhood context module 522b may select a window of points adjacent in the scan pattern. In some embodiments, a plurality of neighborhood data points including a 2-D or 3-D space neighborhood may be selected in order to consider additional ranges of data points.

The up-chirp and down-chirp frequencies from the window of points adjacent in the scan pattern may be stored. The metric calculation module 523b may compute the metric, which may be the variance of the up-chirp or the down-chirp frequencies from the window of points. For example, the variance of the up-chirp frequencies, or the variance of the down-chirp frequencies, or the difference between the variance of the up-chirp frequencies and the variance of the down-chirp frequencies may be compared against respective predetermined thresholds.

If the variance of the up-chirp frequencies, or the variance of the down-chirp frequencies, or the difference between the variance of the up-chirp frequencies and the variance of the down-chirp frequencies is not lower than the respective predetermined threshold, the decision module 524b may determine to reject the POI. Otherwise, the data POI may be approved to become a filtered POI 540b or delegated/transmitted to another filter (not shown).

With a probability that the POI is not an FA, the decision module 524b may score the POI. When the confidence metric is within a predetermined threshold, there is the probability that the POI is not an FA. Then, the POI may be assigned a score by the decision module 524b.

Figure 6:
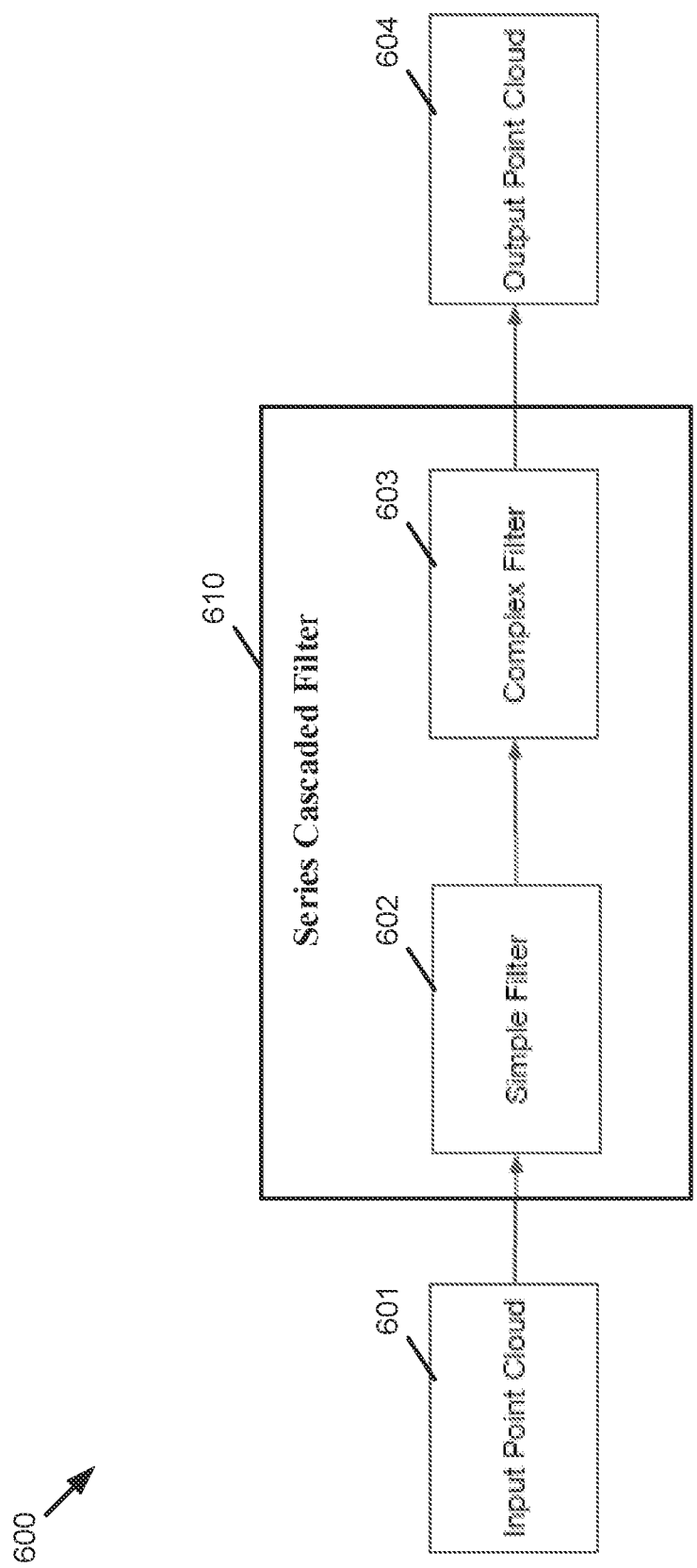
FIG. 6 is a block diagram illustrating an example of a series cascaded point cloud filter according to embodiments of the present disclosure.

FIG. 6 is a block diagram of a system 600 that includes a series cascaded point cloud filter 610 according to embodiments of the present disclosure. According to some embodiments, the series cascaded point cloud filter 610 may include at least one simple filter 602 (e.g., 415a, 415b) and at least one complex filter 603 (e.g., 515a, 515b). An input point cloud 601 may be filtered by the simple filter 602 and the complex filter 603. An output point cloud 604 may be the filtered point cloud. In some scenarios, simple filter 602 includes fewer computational resources to perform the filtering operations described herein relative to the complex filter 603. In such cases, the computational resources required by the simpler filter 602 enable it to perform filtering operations that require shorter compute time relative to the computational resources resident on the complex filter 603.

As discussed above, the simple filter 602 can be configured to perform computationally inexpensive operations to determine neighborhood data points or compute the metric in a manner that requires fewer computational resources, less compute time, and/or less power relative to the complex filter 603.

As an example, the series cascaded point cloud filter may include the simple filter core 415a as described in connection with FIG. 4A and the complex filter core 515a as described in connection with FIG. 5A. As another example, the series cascaded point cloud filter may include the simple filter core 415b as described in connection with FIG. 4B and the complex filter core 515b as described in connection with FIG. 5B. It should be appreciated that the examples described herein are only for illustration purposes. There may be many other embodiments of the series cascaded filter based on this disclosure.

Filter performance may be measured by one or more of the following: latency, computational load, FA rejected, or TD approved. An ideal filter should take less time to process the point cloud, thereby adding a lower latency. Computational load refers to an amount of computational resources required because of the introduction of the filter. An ideal filter takes less amount of computational resources to process the point cloud. FA rejected refers to a quantity of FA points or a number of FA points removed by the Filter. An ideal filter removes all the FA points in the POIs which the filter processes. FA rejected may be determined by:

$m_{FA}=\text{removed}_{FA}/\text{total}_{FA}$

TD approved refers to a quantity of TD points or a number of TD points approved by the filter. An ideal filter approves all the TD points in the POIs which the filter processes. TD approved may be determined by:

$m_{TD}=\text{approved}_{TD}/\text{total}_{TD}$

A combination of different filters may be employed to achieve an optimal performance. For example, a combination of one or more simple filters and one or more complex filters may be used to balance the accuracy, the operational cost and the latency.

Referring to FIG. 6, embodiments of the present disclosure can be configured to use cascaded filters when processing point clouds in a manner that reduces latency. The series cascaded filter 610 may be configured using one or more functions provided by both a simple filter core and a complex filter core. For example, simple filters may operate on as many POIs as possible, while suspect POIs may be transmitted or delegated to complex filters to operate on. The series cascaded filter 610 has the advantages of being almost as fast as a simple filter while having high FA rejected $m_{FA}$ and high TD approved mm. By using the combination of the simple filter core and the complex filter core, the series cascaded filter may have a high FA rejection percentage and a high TD approval percentage while saving the computing time and the amount of computational resources to process the point cloud, thereby improving the performance with a lower latency.

The input point cloud 601 may be received by the series cascaded filter 610. At the simple filter 602, each POI of the input point cloud 601 is filtered. The simple filter may accept or discard as many POIs as possible, and transmit or delegate the suspect POIs to the complex filter 603. At the complex filter 603, the suspect POIs may be accepted or discarded. The filtered point cloud 604 may be output based on the simple filter 602 and the complex filter 603.

Figure 7:
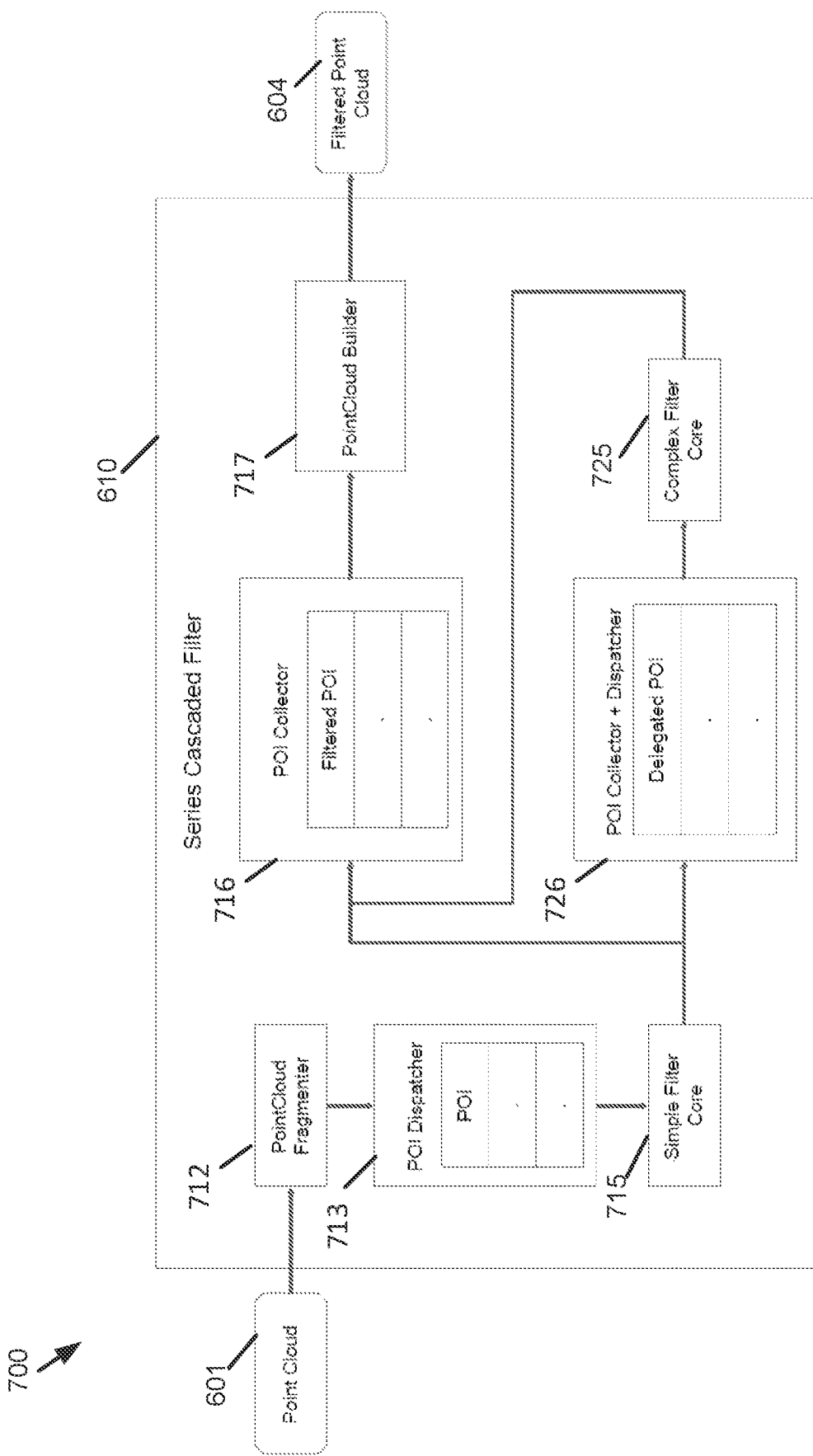
FIG. 7 is a block diagram illustrating detailed structure of a series cascaded point cloud filter according to embodiments of the present disclosure.

FIG. 7 is a block diagram 700 illustrating detailed structure of the series cascaded point cloud filter 610 according to some embodiments. For example, the series cascaded point cloud filter 610 may include a point cloud fragmenter 712, a POI dispatcher 713, a simple filter core 715 (e.g., the filter core for the simple filter 602), a complex filter core 725 (e.g., the filter core for the complex filter 603), a POI collector 716, a POI collector and dispatcher 726, and/or a point cloud builder 717. The point cloud 601 may be obtained (e.g., received, acquired) by the point cloud fragmenter 712, which identifies regions of the point cloud 601 that the filter 610 will be working on and creates POIs that can be sent to the POI dispatcher 713. Portions of the point cloud 601 that the filter 610 won't be working on may be transmitted to the point cloud builder 717 (link not shown). The POI dispatcher 713 receives the POIs from the point cloud fragmenter 712 and sends the POIs to the simple filter core 715 one POI at a time for processing.

According to some embodiments, the POI collector and dispatcher 726 may be placed in between the simple filter core 715 and the complex filter core 725 to aid in the transfer of the POIs to the complex filter core 725 for further processing to render a determination. Once the complex filter core 725 operates on the POI, the POI is sent to the POI collector 716, which collects the POIs processed from the simple filter core 715 and the complex filter core 725. These pooled POIs are then sent to the point cloud builder 717.

Figure 8:
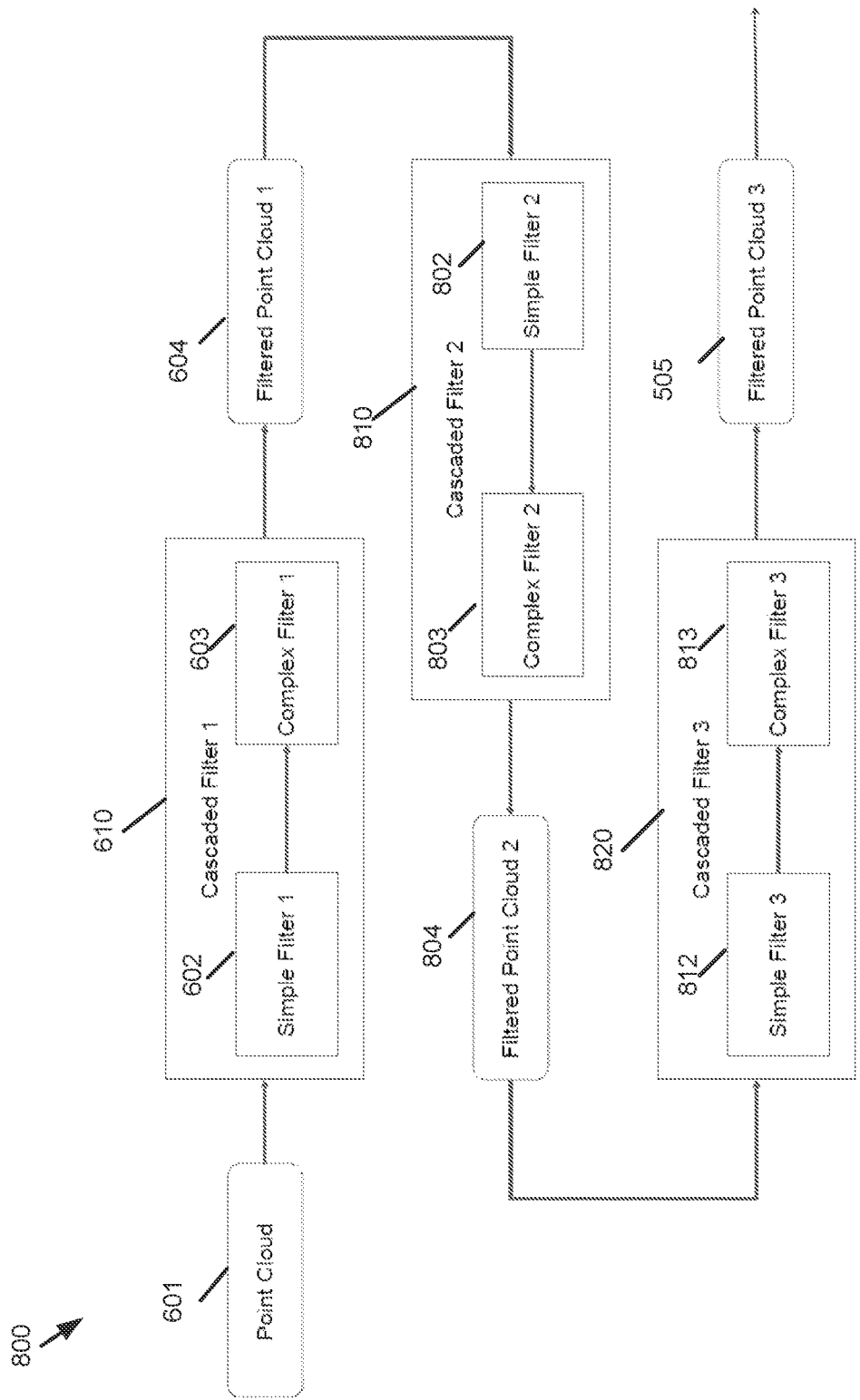
FIG. 8 is a block diagram illustrating an example of multiple series cascaded point cloud filters according to embodiments of the present disclosure.

FIG. 8 is a block diagram of a system 800 that includes multiple series cascaded point cloud filters (e.g., 610, 810, 820) according to embodiments of the present disclosure. Using multiple series cascaded point cloud filters in the manner described herein enable embodiments of the present disclosure to achieve an optimal performance to balance accuracy, operational costs and latency.

Referring to FIG. 8, the series cascaded point cloud filter 610 may be followed by a series cascaded point cloud filter 810. The output point cloud 604 of the series cascaded point cloud filter 610 may be the filtered point cloud 1, which may be an input point cloud for the series cascaded point cloud filter 810. The series cascaded point cloud filter 810 may include a simple filter 802 and a complex filter 803. The simple filter 802 has similar functions like the simple filter 602. The complex filter 803 has similar functions like the complex filter 603. Thus, the series cascaded point cloud filter 810 may include one or more functions of the simple filter 602 and the complex filter 603.

Similarly, the series cascaded point cloud filter 810 may be followed by a series cascaded point cloud filter 820, which may include an additional simple filter (e.g., simple filter 812) and an additional complex filter 813 (e.g., complex filter 813). The output point cloud 804 of the series cascaded point cloud filter 810 may be the filtered point cloud 2, which may be an input point cloud for the series cascaded point cloud filter 820. In this fashion, embodiments of the present disclosure can use multiple series cascaded point cloud filters to perform filtering techniques.

Figure 9:
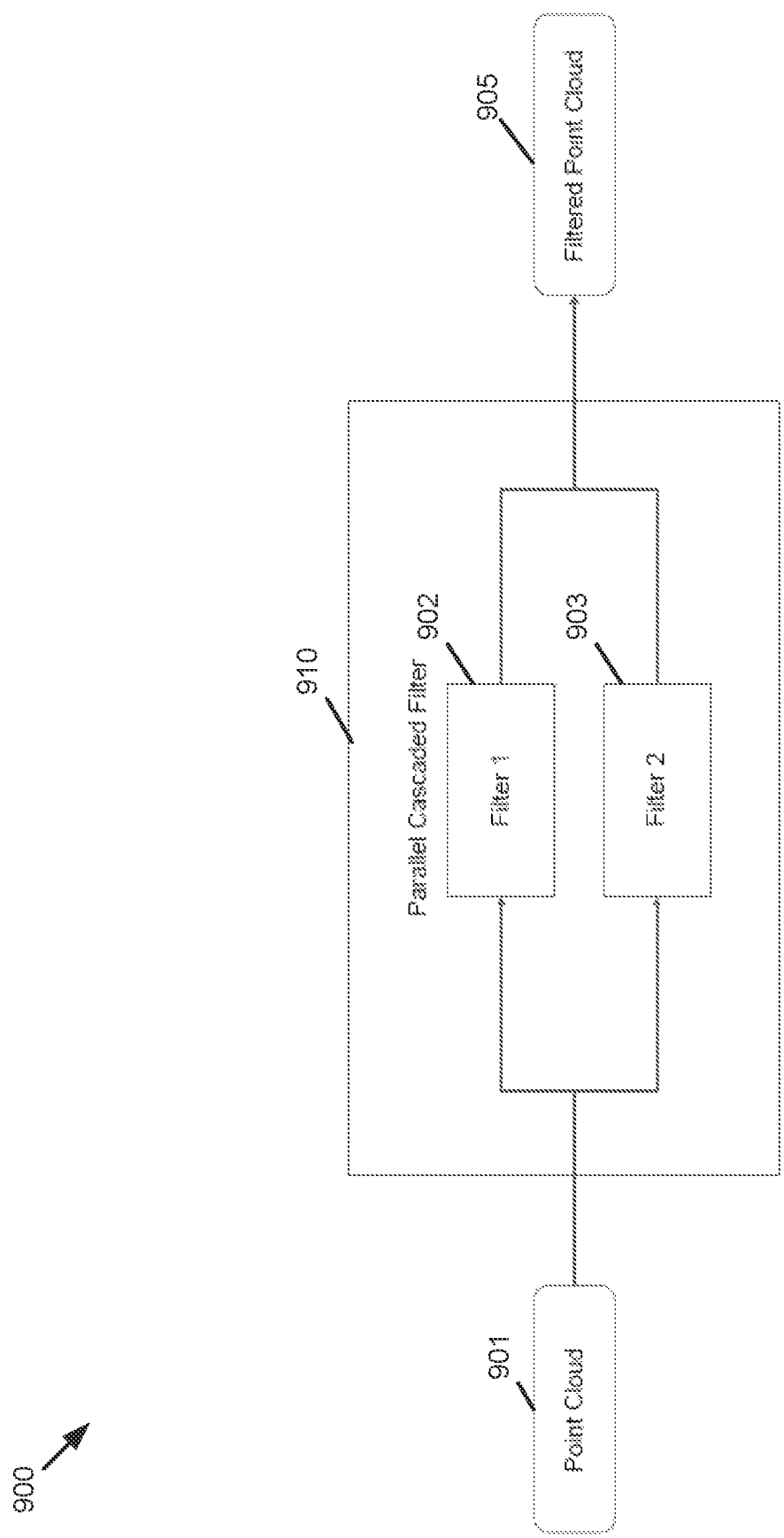
FIG. 9 is a block diagram illustrating an example of a parallel cascaded point cloud filter according to embodiments of the present disclosure.

FIG. 9 is a block diagram of a system 900 that includes a parallel cascaded point cloud filter 910 according to embodiments of the present disclosure. According to some embodiments, the parallel cascaded point cloud filter 910 may include at least two filters 902 and 903. The at least two filters 902 and 903 may be at least two different filters. For example, the at least two filters 902 and 903 may include at least two of the filters 415a, 415b, 515a, or 515b. The at least two filters 902 and 903 may have different neighborhood selection and different metrics. The at least two filters 902 and 903 may be simple filters, complex filters, or a combination of simple and complex filters. Part of the at least two filters may be simple filter(s), and part of the at least two filters may be complex filter(s).

An input point cloud 901 may be filtered by the filter 902 and the filter 903 independently in parallel. For example, a POI may be received at the filter 902 and at the filter 903 independently in parallel. The filters 902 and 903 may be used in parallel to score POIs. The parallel cascaded point cloud filter 910 including at least two filters 902 and 903 may be used on critical regions of the point cloud 901 as the two filters 902 and 903 work independently, thereby increasing the confidence of the filter decision.

The filter 902 may include a neighborhood context module to select a set of neighborhood points of the POI, a metric calculation module to compute a metric for the set of neighborhood points, and a decision module to determine a score of the POI based on the metric. The filter 903 may include a different neighborhood context module to select a different set of neighborhood points of the POI, a different metric calculation module to compute a different metric, and a different decision module to determine a score of the POI.

When the filters 902 and 903 are used in parallel, the decision module of the filter 902 may determine one score for the POI according to a predetermined rule, and the decision module of the filter 903 may determine another score for the POI according to the predetermined rule. In this case, the decision modules of the filters may only score the POI. The decision modules of the filter 902 and 903 may determine a respective score of the POI independently in parallel according to the predetermined rule. The filters 902 and 903 may output the scores of the POI independently in parallel.

The output scores of the POI from both the filter 902 and the filter 903 may be merged. The POI may be accepted, modified, or rejected based on the output scores of the POI from both filters 902 and 903 according to a set of predetermined thresholds. As an example, when at least one of the scores from both filters 902 and 903 is below a first predetermined threshold, the POI may be rejected. As another example, when both scores are above the first predetermined threshold but one score of the two scores is below a second predetermined threshold, the POI may be modified. As yet another example, when both scores are above the second predetermined threshold, the POI may be accepted.

The parallel cascaded point cloud filter 910 may transmit the accepted or modified POI to an output point cloud 905, which may be the filtered point cloud. The rejected POI may be deleted or removed.

Figure 10:
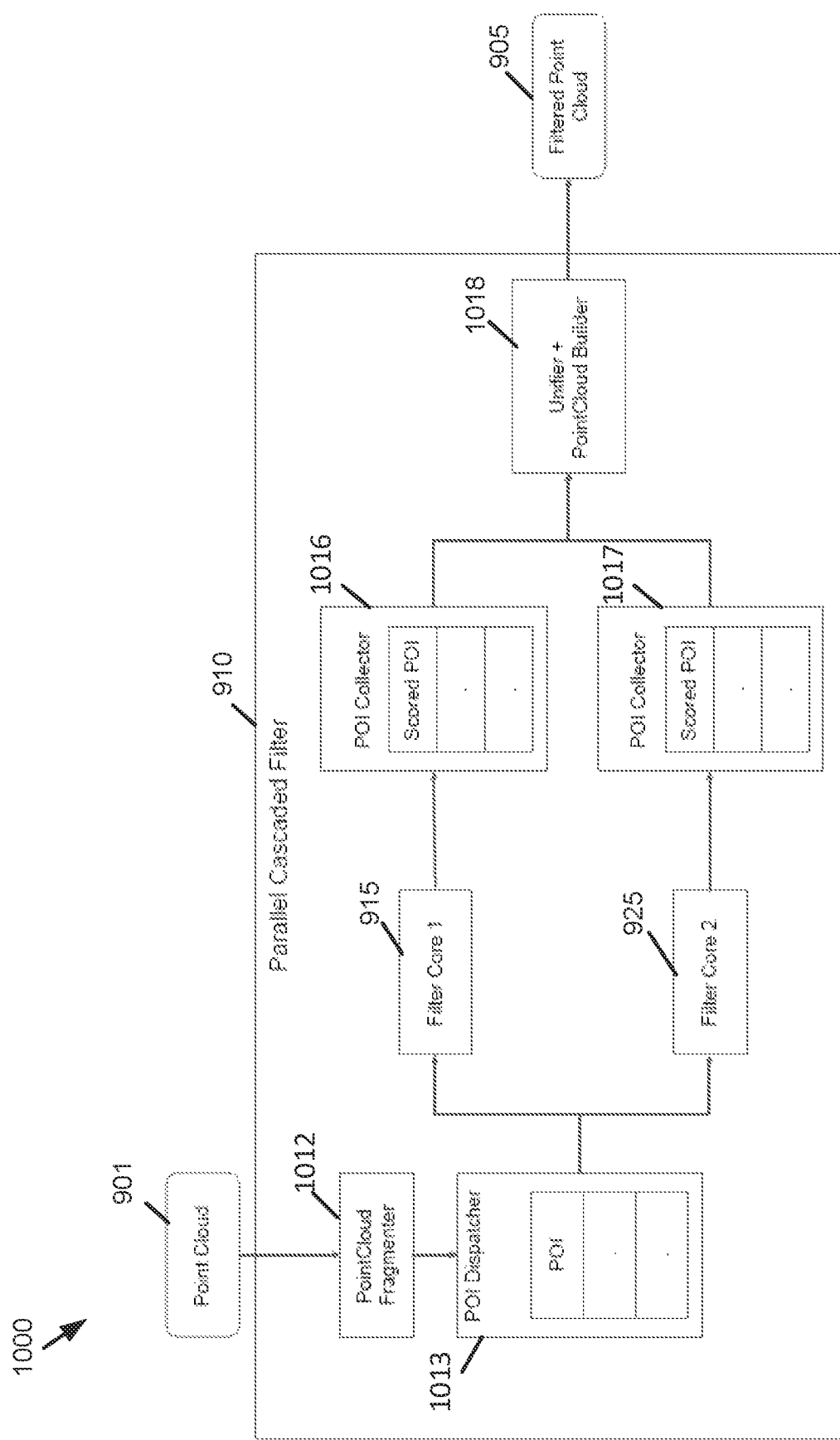
FIG. 10 is a block diagram illustrating detailed structure of a parallel cascaded point cloud filter according to embodiments of the present disclosure.

FIG. 10 is a block diagram 1000 illustrating detailed structure of the parallel cascaded point cloud filter 910 according to some embodiments. For example, the parallel cascaded point cloud filter 910 may include a point cloud fragmenter 1012, a POI dispatcher 1013, a filter core 915 (e.g., the filter core for the filter 902), a filter core 925 (e.g., the filter core for the complex filter 903), a POI collector 1016, a POI collector 1017, and/or a unifier with point cloud builder 1018. The point cloud 901 may be obtained (e.g., received, acquired) by the point cloud fragmenter 1012, which identifies regions of the point cloud 901 that the filter 910 will be working on and creates POIs that can be sent to the POI dispatcher 1013. Portions of the point cloud 901 that the filter 910 won't be working on may be transmitted to the point cloud builder 1018 (link not shown). The POI dispatcher 1013 receives the POIs from the point cloud fragmenter 1012 and sends the POIs to the filter core 915 and the filter core 925 in parallel, one POI at a time for processing.

According to some embodiments, the filter core 915 and the filter 925 operate on the POI independently in parallel. The filter core 915 may determine a score for the POI. The filter core 915 may determine another score for the POI. After the POI is processed by the filter core 915, the scored POI, which is the POI with the score from the filter core 915, is sent to the POI collector 1016. After the POI is processed by the filter core 925, the scored POI, which is the POI with another score from the filter core 925, is sent to the POI collector 1017. These scored POIs are then sent to the unifier with point cloud builder 1018.

The unifier with point cloud builder 1018 may be tasked with merging the scored POIs output from both the filter cores 915, 925. The unifier with point cloud builder 1018 may determine to accept, modify or reject the scored POIs on the basis of a set thresholds. The POI may be accepted, modified, or rejected based on the output scores of the POI from both filter cores 915 and 925 according to a set of predetermined thresholds. As an example, when both scores from both filter cores 915 and 925 exceed the predetermined thresholds, the POI may be rejected. As another example, when at least one of the scores is below the predetermined thresholds, the POI may be modified/accepted/removed. As yet another example, when both scores are below the predetermined thresholds, the POI may be accepted. The parallel cascaded point cloud filter 910 may transmit the accepted or modified POI to a filtered point cloud 905. The rejected POI may be deleted or removed.

Figure 11:
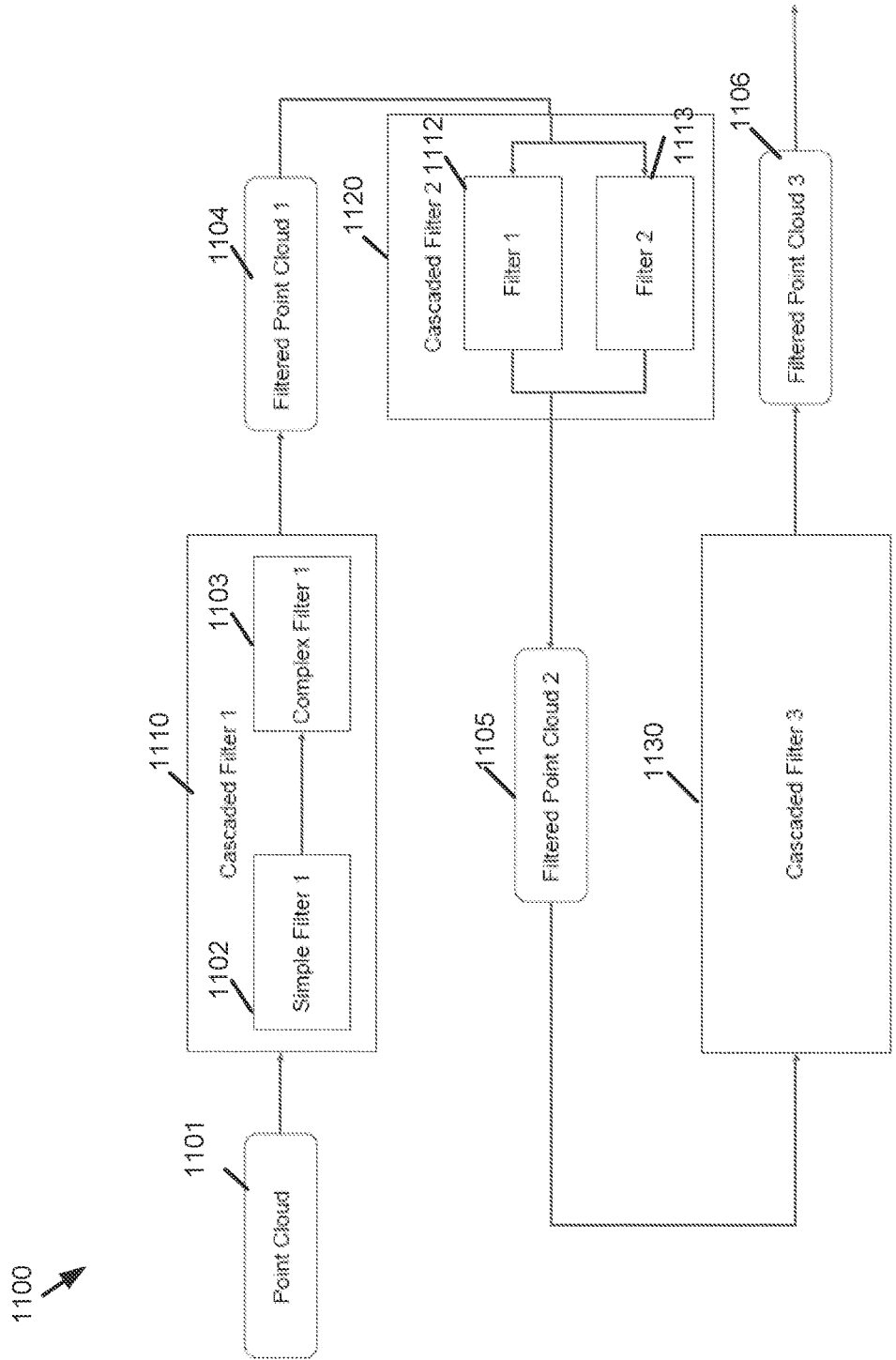
FIG. 11 is a block diagram illustrating an example of multiple cascaded point cloud filters according to embodiments of the present disclosure.

FIG. 11 is a block diagram of a system 1100 that includes multiple cascaded point cloud filters (e.g., 1110, 1120, 1130) according to embodiments of the present disclosure. Using multiple cascaded point cloud filters in the manner described herein enable embodiments of the present disclosure to achieve an optimal performance to improve confidence and balance accuracy, operational costs and latency.

Referring to FIG. 11, an input point cloud 1101 may be received by a series cascaded point cloud filter 1110, which may be followed by a parallel cascaded point cloud filter 11200. The output point cloud 1104 of the series cascaded point cloud filter 1110 may be the filtered point cloud 1, which may be an input point cloud for the parallel cascaded point cloud filter 1120. The series cascaded point cloud filter 1110 may include a simple filter 1102 and a complex filter 1103. The simple filter 1102 has similar functions like the simple filter 602. The complex filter 1103 has similar functions like the complex filter 603. Thus, the series cascaded point cloud filter 1110 may include one or more functions of the simple filter 1102 and the complex filter 1103.

The parallel cascaded point cloud filter 1120 may include a filter 1112 and a filter 1113 in parallel. The filters 1112, 1113 have similar functions like the filters 902, 903. The output point cloud 1105 of the parallel cascaded point cloud filter 1120 may be the filtered point cloud 2, which may be an input point cloud for another cascaded point cloud filter 1130. The cascaded point cloud filter 1130 may be a series cascaded point cloud filter, or a parallel cascaded point cloud filter. In this fashion, embodiments of the present disclosure can use multiple series cascaded point cloud filters to perform filtering techniques to achieve an optimal performance to improve confidence and balance accuracy, operational costs and latency.

Figure 12:
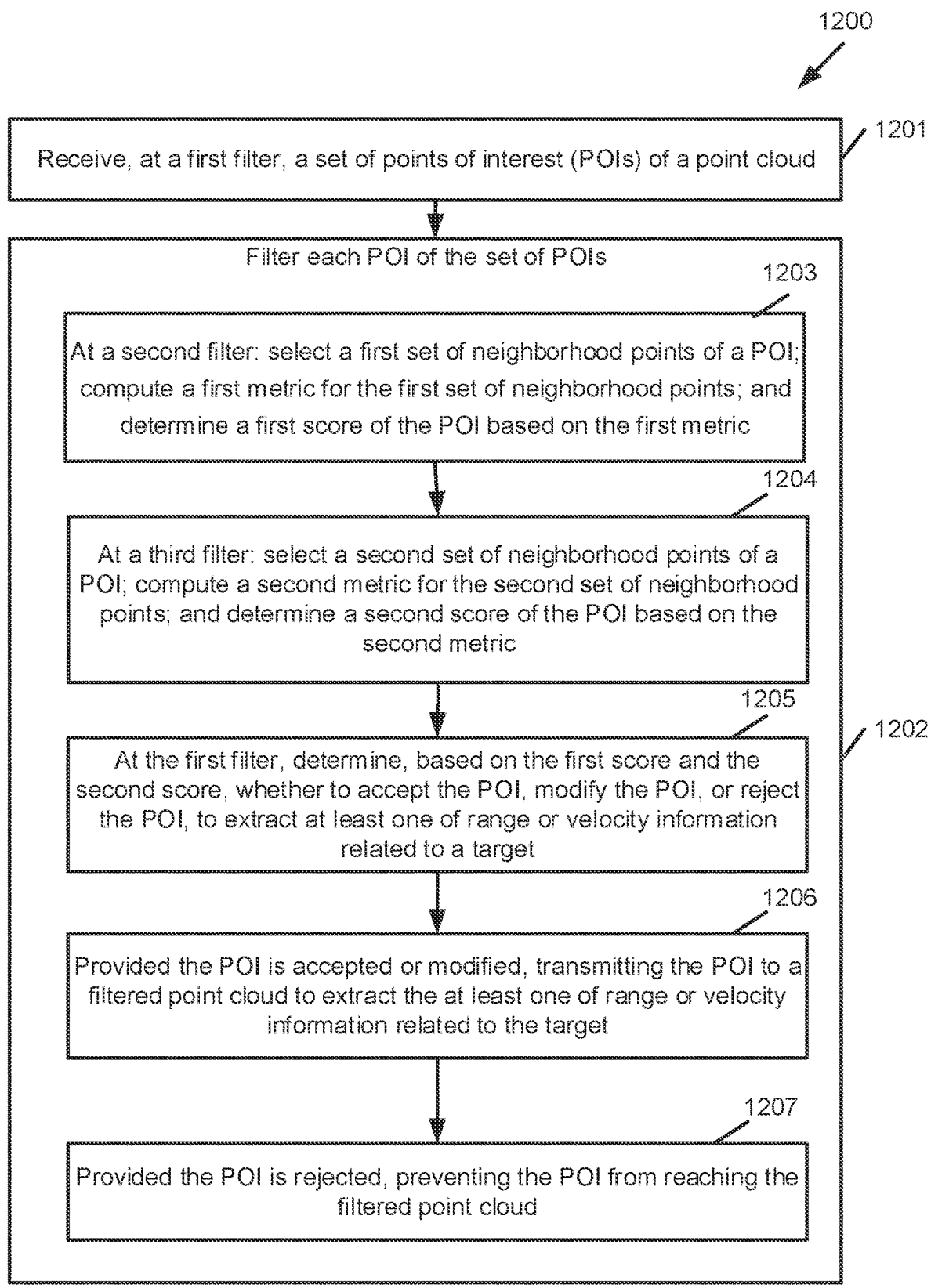
FIG. 12 is a block diagram illustrating an example of a process to filter a point cloud according to embodiments of the present disclosure.

FIG. 12 is a flow diagram illustrating an example of a process to filter a point cloud according to embodiments of the present disclosure. For example, the process may be performed by a signal processing unit 112 of a LiDAR system, as illustrated in FIG. 1A-FIG. 1B. In this process, the FA points may be removed, thereby, the accuracy in the estimated target range/velocity may be improved.

At block 1201, at a first filter, a set of POIs of a point cloud are received, where each POI of the set of POIs includes one or more points. In one embodiment, the first filter may be a parallel cascaded point cloud filter which includes a second filter and a third filter.

At block 1202, each POI of the set of POIs is filtered, where filtering each POI comprises filtering at the second filter, filtering at the third filter, and filtering at the first filter.

At block 1203, at the second filter, a first set of neighborhood points of a POI is selected; a first metric for the first set of neighborhood points is computed; and a first score of the POI is determined based on the first metric.

At block 1204, at the third filter, a second set of neighborhood points of the POI is selected; a second metric for the second set of neighborhood points is computed; and a second score of the POI is determined based on the second metric.

At block 1205, at the first filter, e.g., at a decision module of the first filter, based on the first score and the second score, whether to accept the POI, modify the POI, or reject the POI is determined, to extract at least one of range or velocity information related to a target.

At block 1206, provided the POI is accepted or modified, the POI is transmitted to a filtered point cloud, which may be an output point cloud.

At block 1207, provided the POI is rejected, the POI is prevented from reaching the filtered point cloud.

In one embodiment, each POI of the set of POIs is filtered at the second filter and at the third filter independently in parallel.

In one embodiment, the POI is received at the second filter and at the third filter independently in parallel.

In one embodiment, the POI is rejected in response to determining that at least one of the first score or the second score is below a predetermined threshold.

In one embodiment, the POI is accepted or modified in response to determining that both the first score and the second score are not below a predetermined threshold.

In one embodiment, the second set of neighborhood points are different than the first set of neighborhood points.

In one embodiment, the second metric for the second set of neighborhood points is different than the first metric for the first set of neighborhood points.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operations may be performed, at least in part, concurrently with other operations. Instructions or sub-operations of distinct operations may be performed in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A method of filtering points in a light detection and ranging (LiDAR) system, comprising:
  receiving, at a first filter, a set of points of interest (POIs) of a point cloud; and
  filtering each POI of the set of POIs, the filtering comprising:
    at a second filter:
      determining a first score of a POI based on a first metric;
    at a third filter:
      determining a second score of the POI based on a second metric; and
    at the first filter:
      determining, based on the first score and the second score, whether to accept, modify, or reject the POI, to extract at least one of range or velocity information related to a target.

2. The method of claim 1, wherein the filtering each POI of the set of POIs comprises filtering at the second filter and at the third filter independently in parallel.

3. The method of claim 1, wherein the POI is received at the second filter and at the third filter independently in parallel.

4. The method of claim 1, wherein the determining, based on the first score and the second score, whether to accept, modify, or reject the POI, comprises determining to reject the POI in response to determining that at least one of the first score or the second score is below a predetermined threshold.

5. The method of claim 1, wherein the determining, based on the first score and the second score, whether to accept, modify, or reject the POI, comprises determining to accept or modify the POI in response to determining that both the first score and the second score are not below a predetermined threshold.

6. The method of claim 1, wherein the filtering further comprises:
  at the second filter:
    selecting a first set of neighborhood points of the POI; and
  at the third filter:
    selecting a second set of neighborhood points of the POI, wherein the second set of neighborhood points is different than the first set of neighborhood points.

7. The method of claim 1, wherein the filtering further comprises:
  at the second filter:
    computing the first metric for a first set of neighborhood points; and
  at the third filter:
    computing the second metric for a second set of neighborhood points, wherein the second metric for the second set of neighborhood points is different than the first metric for the first set of neighborhood points.

8. A light detection and ranging (LiDAR) system, comprising:
  a processor; and
  a memory to store instructions that, when executed by the processor, cause the LiDAR system to:
    receive, at a first filter, a set of points of interest (POIs) of a point cloud; and
    filter each POI of the set of POIs, wherein to filter each POI of the set of POIs, the instructions, when executed by the LiDAR system, cause the LiDAR system to:
      at a second filter:
        determine a first score of a POI based on a first metric;
      at a third filter:
        determine a second score of the POI based on a second metric; and
      at the first filter:
        determine, based on the first score and the second score, whether to accept, modify, or reject the POI, to extract at least one of range or velocity information related to a target.

9. The LiDAR system of claim 8, wherein the LiDAR system is to filter at the second filter and at the third filter independently in parallel.

10. The LiDAR system of claim 8, wherein the POI is received at the second filter and at the third filter independently in parallel.

11. The LiDAR system of claim 8, wherein the LiDAR system is to reject the POI in response to determining that at least one of the first score or the second score is below a predetermined threshold.

12. The LiDAR system of claim 8, wherein the LiDAR system is to accept or modify the POI in response to determining that both the first score and the second score are not below a predetermined threshold.

13. The LiDAR system of claim 8, wherein the LiDAR system is further to:
  at the second filter:
    select a first set of neighborhood points of the POI; and
  at the third filter:
    select a second set of neighborhood points of the POI, wherein the second set of neighborhood points is different than the first set of neighborhood points.

14. The LiDAR system of claim 8, wherein the LiDAR system is further to:
  at the second filter:
    compute the first metric for a first set of neighborhood points; and
  at the third filter:
    compute the second metric for a second set of neighborhood points, wherein the second metric for the second set of neighborhood points is different than the first metric for the first set of neighborhood points.

15. A light detection and ranging (LiDAR) system, comprising:
  an optical source to transmit a portion of a light signal towards a target;
  an optical receiver to receive a return beam from the target based on the light signal;
  a circuitry; and
  a memory to store instructions that, when executed by the circuitry, cause the LiDAR system to:
    receive, at a first filter, a set of points of interest (POIs) of a point cloud; and
    filter each POI of the set of POIs, wherein to filter each POI of the set of POIs, the instructions, when executed by the circuitry, cause the LiDAR system to:
      at a second filter:
        determine a first score of a POI based on a first metric;
      at a third filter:
        determine a second score of the POI based on a second metric; and at the first filter:
   determine, based on the first score and the second score, whether to accept, modify, or reject the POI, to extract at least one of range or velocity information related to the target.

16. The LiDAR system of claim 15, wherein the LiDAR system is to filter at the second filter and at the third filter independently in parallel.

17. The LiDAR system of claim 15, wherein the POI is received at the second filter and at the third filter independently in parallel.

18. The LiDAR system of claim 15, wherein the LiDAR system is to reject the POI in response to determining that at least one of the first score or the second score is below a predetermined threshold.

19. The LiDAR system of claim 15, wherein the LiDAR system is to accept or modify the POI in response to determining that both the first score and the second score are not below a predetermined threshold.

20. The LiDAR system of claim 15, wherein the LiDAR system is to:
   at the second filter:
      select a first set of neighborhood points of the POI; and
   at the third filter:
      select a second set of neighborhood points of the POI, wherein the second set of neighborhood points is different than the first set of neighborhood points.

21. The LiDAR system of claim 15, wherein the LiDAR system is further to:
   at the second filter:
      compute the first metric for a first set of neighborhood points; and
   at the third filter:
      compute the second metric for a second set of neighborhood points, wherein the second metric for the second set of neighborhood points is different than the first metric for the first set of neighborhood points.

* * * * *